United States Patent
McFarland, Jr.

(10) Patent No.: US 11,537,701 B2
(45) Date of Patent: Dec. 27, 2022

(54) TRANSPORT RELATED N-FACTOR AUTHENTICATION

(71) Applicant: TOYOTA MOTOR NORTH AMERICA, INC., Plano, TX (US)

(72) Inventor: Stephen Paul McFarland, Jr., Allen, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 90 days.

(21) Appl. No.: 16/837,988

(22) Filed: Apr. 1, 2020

(65) Prior Publication Data

US 2021/0312031 A1  Oct. 7, 2021

(51) Int. Cl.
*G06F 21/40* (2013.01)
*G06Q 50/30* (2012.01)
*H04L 9/40* (2022.01)

(52) U.S. Cl.
CPC .......... *G06F 21/40* (2013.01); *G06Q 50/30* (2013.01); *H04L 63/08* (2013.01); *H04L 63/107* (2013.01); *H04L 2463/082* (2013.01)

(58) Field of Classification Search
CPC .......... G06F 21/40; G06F 2221/2131; G06F 2221/2133; G06F 21/316; G06F 21/34; H04L 63/08; H04L 63/107; H04L 2463/082; H04L 9/3239; H04L 9/3247; H04L 9/50; G06Q 50/30; G06V 20/56; G06V 40/20
See application file for complete search history.

(56) References Cited

U.S. PATENT DOCUMENTS

| | | | | |
|---|---|---|---|---|
| 5,499,294 A | * | 3/1996 | Friedman | G07D 7/004 380/246 |
| 5,898,779 A | * | 4/1999 | Squilla | H04N 1/32128 713/176 |
| 6,269,446 B1 | * | 7/2001 | Schumacher | H04L 9/3247 713/181 |
| 6,532,541 B1 | * | 3/2003 | Chang | H04L 9/3247 380/216 |
| 6,757,827 B1 | * | 6/2004 | Geist | H04L 9/3247 713/176 |
| 6,850,222 B1 | * | 2/2005 | Rosenberg | G05G 9/047 345/156 |
| 7,162,370 B2 | | 1/2007 | Obradovich | |
| 9,196,104 B2 | | 11/2015 | Dumas et al. | |
| 9,783,162 B2 | | 10/2017 | Hoyos et al. | |
| 10,074,224 B2 | | 9/2018 | Ho et al. | |
| 10,081,298 B2 | | 9/2018 | Stanfield et al. | |
| 10,181,099 B2 | | 1/2019 | Penilla et al. | |
| 10,275,589 B1 | | 4/2019 | Mossoba et al. | |
| 10,407,026 B2 | | 9/2019 | Penilla et al. | |

(Continued)

FOREIGN PATENT DOCUMENTS

CN  103648852 B  8/2016
EP  2945129 B1  3/1993

(Continued)

*Primary Examiner* — Aravind K Moorthy

(57) ABSTRACT

An example operation includes one or more of determining, via a transport, that a person seeks access to the transport, visually indicating, via the transport, an action for the person to perform, receiving, via the transport, the action and validating, via the transport, that the person is associated with the transport, based on the receiving.

20 Claims, 25 Drawing Sheets

(56) References Cited

U.S. PATENT DOCUMENTS

| | | | |
|---|---|---|---|
| 10,442,399 B2 | 10/2019 | Penilla et al. | |
| 10,677,603 B1* | 6/2020 | Kelly | G08G 1/202 |
| 2002/0060736 A1* | 5/2002 | Wakao | H04N 1/32128 |
| | | | 348/207.99 |
| 2002/0083323 A1* | 6/2002 | Cromer | H04L 9/3234 |
| | | | 713/176 |
| 2006/0020808 A1* | 1/2006 | Yachida | H04L 9/3297 |
| | | | 713/176 |
| 2006/0036864 A1* | 2/2006 | Parulski | H04L 9/3247 |
| | | | 713/176 |
| 2006/0047966 A1* | 3/2006 | Iwamura | H04L 9/14 |
| | | | 713/176 |
| 2006/0242423 A1* | 10/2006 | Kussmaul | H04L 9/3247 |
| | | | 713/182 |
| 2007/0016783 A1* | 1/2007 | Saito | H04L 9/3247 |
| | | | 713/175 |
| 2007/0074028 A1* | 3/2007 | Makishima | H04L 9/3247 |
| | | | 713/176 |
| 2007/0253592 A1* | 11/2007 | Sun | H04L 9/3247 |
| | | | 382/100 |
| 2007/0255953 A1* | 11/2007 | Peyret | H04L 63/1483 |
| | | | 713/168 |
| 2008/0175377 A1* | 7/2008 | Merrill | H04K 1/00 |
| | | | 713/180 |
| 2009/0015373 A1* | 1/2009 | Kelly | B60R 25/2081 |
| | | | 340/5.62 |
| 2009/0046708 A1* | 2/2009 | Koziol | H04L 9/3247 |
| | | | 370/360 |
| 2010/0180121 A1* | 7/2010 | Chow | H04L 63/08 |
| | | | 726/5 |
| 2010/0185858 A1* | 7/2010 | Nishimi | H04N 1/4406 |
| | | | 713/168 |
| 2011/0099040 A1* | 4/2011 | Felt | G01C 21/3438 |
| | | | 715/764 |
| 2011/0289571 A1* | 11/2011 | Yasuhara | G06F 21/31 |
| | | | 726/7 |
| 2012/0110333 A1* | 5/2012 | Lukkarila | G06F 21/51 |
| | | | 713/193 |
| 2013/0156257 A1* | 6/2013 | Anan | H04L 9/3247 |
| | | | 382/100 |
| 2013/0198519 A1* | 8/2013 | Marien | H04L 9/3234 |
| | | | 713/172 |
| 2013/0238167 A1* | 9/2013 | Stanfield | B60Q 1/2696 |
| | | | 701/2 |
| 2014/0247343 A1* | 9/2014 | Chen | G06Q 30/0267 |
| | | | 348/135 |
| 2014/0266600 A1* | 9/2014 | Alberth, Jr. | G06F 21/32 |
| | | | 340/5.83 |
| 2014/0289323 A1* | 9/2014 | Kutaragi | H04L 67/42 |
| | | | 709/203 |
| 2014/0306799 A1 | 10/2014 | Ricci | |
| 2015/0104073 A1* | 4/2015 | Rodriguez-Serrano | |
| | | | G06F 16/5846 |
| | | | 382/105 |
| 2015/0198936 A1* | 7/2015 | McGee | E02F 9/20 |
| | | | 700/40 |
| 2016/0046298 A1* | 2/2016 | DeRuyck | B60W 50/14 |
| | | | 340/576 |
| 2016/0071482 A1* | 3/2016 | Backstrom | G07C 5/06 |
| | | | 701/29.1 |
| 2016/0098869 A1* | 4/2016 | Rood | G07C 5/0808 |
| | | | 701/32.7 |
| 2016/0278444 A1* | 9/2016 | Jordan | A41D 1/002 |
| 2017/0005799 A1* | 1/2017 | Morimoto | H04L 9/0897 |
| 2017/0008490 A1* | 1/2017 | Sako | G07C 9/00571 |
| 2017/0164569 A1* | 6/2017 | Andrews | G05B 15/02 |
| 2017/0222612 A1* | 8/2017 | Zollner | H03G 5/165 |
| 2017/0250974 A1* | 8/2017 | Antonyraj | H04W 12/50 |
| 2017/0278122 A1* | 9/2017 | Kaehler | G06K 9/00979 |
| 2018/0096236 A1* | 4/2018 | Bermundo | G06K 15/007 |
| 2018/0130327 A1* | 5/2018 | Rogers | G08B 21/0222 |
| 2018/0136655 A1* | 5/2018 | Kim | G05D 1/0011 |
| 2018/0136884 A1* | 5/2018 | Ikari | G06F 1/1285 |
| 2018/0181739 A1* | 6/2018 | Zhong | G06F 21/62 |
| 2018/0288033 A1* | 10/2018 | Kamal | G06Q 20/38215 |
| 2018/0323972 A1* | 11/2018 | Reed | G06F 3/013 |
| 2018/0339719 A1* | 11/2018 | Loughlin | B61L 3/006 |
| 2018/0358020 A1* | 12/2018 | Chen | G10L 15/02 |
| 2019/0036887 A1* | 1/2019 | Miller | G06Q 20/02 |
| 2019/0064806 A1* | 2/2019 | Nix | B60W 50/00 |
| 2019/0097812 A1* | 3/2019 | Toth | H04L 9/3213 |
| 2019/0121981 A1* | 4/2019 | Fu | G06F 9/4401 |
| 2019/0123911 A1* | 4/2019 | Riley | H04L 9/3236 |
| 2019/0172456 A1* | 6/2019 | Lee | G06T 11/60 |
| 2019/0232860 A1* | 8/2019 | Ferrone | B60Q 1/2615 |
| 2019/0243451 A1* | 8/2019 | Wakuda | G06F 3/038 |
| 2019/0289077 A1* | 9/2019 | Sacchetti | G08B 7/06 |
| 2019/0329672 A1* | 10/2019 | Brown | B60N 2/0232 |
| 2020/0023753 A1* | 1/2020 | Alequin | B60Q 9/00 |
| 2020/0027140 A1* | 1/2020 | Mangal | G06Q 30/0283 |
| 2020/0034554 A1* | 1/2020 | Enomoto | H04L 9/085 |
| 2020/0090224 A1* | 3/2020 | Falconer | B60K 35/00 |
| 2020/0153636 A1* | 5/2020 | Takada | B60R 16/023 |
| 2020/0175446 A1* | 6/2020 | Kurosawa | G06T 13/80 |
| 2020/0184823 A1* | 6/2020 | Eigel | G06Q 50/30 |
| 2020/0198487 A1* | 6/2020 | Muramatsu | G06Q 30/04 |
| 2020/0202142 A1* | 6/2020 | To | G05D 1/0088 |
| 2020/0228343 A1* | 7/2020 | Yu | H04L 9/3247 |
| 2020/0282878 A1* | 9/2020 | Gandhi | B60N 2/4279 |
| 2020/0285240 A1* | 9/2020 | Diehl | B60Q 5/005 |
| 2020/0332887 A1* | 10/2020 | Jeong | F16H 61/08 |
| 2020/0391773 A1* | 12/2020 | Zhang | B61F 5/386 |
| 2021/0006578 A1* | 1/2021 | El-Moussa | H04L 63/1425 |
| 2021/0019963 A1* | 1/2021 | Salter | B60K 31/0008 |
| 2021/0044577 A1* | 2/2021 | Jung | G06K 19/06 |
| 2021/0073363 A1* | 3/2021 | Talha | H04W 4/40 |
| 2021/0076208 A1* | 3/2021 | Hassani | H04W 4/40 |
| 2021/0089983 A1* | 3/2021 | Tamanaha | G06Q 10/06311 |
| 2021/0096918 A1* | 4/2021 | Ogawa | B60R 16/0231 |
| 2021/0319132 A1* | 10/2021 | Zhang | H04L 9/3239 |
| 2022/0164214 A1* | 5/2022 | Yu | G06F 8/65 |
| 2022/0207116 A1* | 6/2022 | Ok | H04L 9/3273 |

FOREIGN PATENT DOCUMENTS

| | | |
|---|---|---|
| FR | 3030850 A1 | 6/2016 |
| KR | 20170047195 A | 5/2017 |
| WO | 2017205961 A1 | 12/2017 |

* cited by examiner

120

130

| Displayed Image | Required Response |
|---|---|
| Say Hello | Vocal "Hello" |
| Tap Handle | Handle Tap |
|  | Vocal "Apple" |
|  | Vocal "Larry" |
|  | Handle Tap |

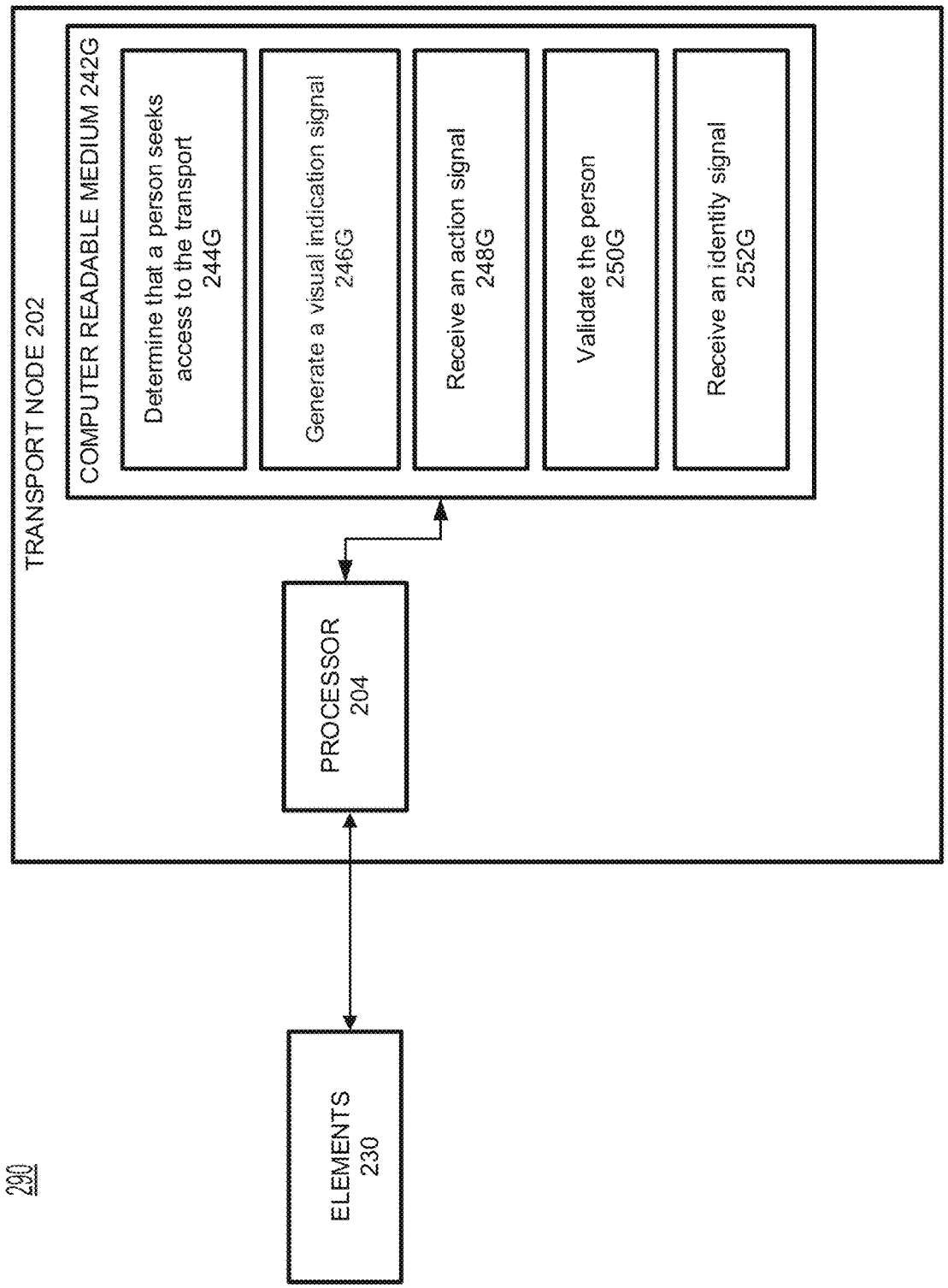

TRANSPORT RELATED N-FACTOR AUTHENTICATION

TECHNICAL FIELD

This application generally relates to authentication, and more particularly, to transport related n-factor authentication.

BACKGROUND

Vehicles or transports, such as cars, motorcycles, trucks, planes, trains, etc., generally provide transportation needs to occupants and/or goods in a variety of ways. Functions related to transports may be identified and utilized by various computing devices, such as a smartphone or a computer.

SUMMARY

One example embodiment provides a method that includes one or more of determining, via a transport, that a person seeks access to the transport, visually indicating, via the transport, an action for the person to perform, receiving, via the transport, the action and validating, via the transport, that the person is associated with the transport, based on the receiving.

Another example embodiment provides a system that includes server, comprising a processor and a memory, wherein the processor is configured to perform one or more of determine that a person seeks access to the transport, generate a visual indication signal to instruct a display to display an image associated with action for the person to perform, receive an action signal, from a detector, associated with detection of performance of the action and validate that the person is associated with the transport, based on the action signal.

A further example embodiment provides a non-transitory computer readable medium comprising instructions, that when read by a processor, cause the processor to perform one or more of determine that a person seeks access to the transport, generate a visual indication signal to instruct a display to display an image associated with action for the person to perform, receive an action signal, from a detector, associated with detection of performance of the action and validate that the person is associated with the transport, based on the action signal.

BRIEF DESCRIPTION OF THE DRAWINGS

FIG. 2G illustrates still yet an even further transport network diagram, according to example embodiments.

DETAILED DESCRIPTION

Figure 1A:
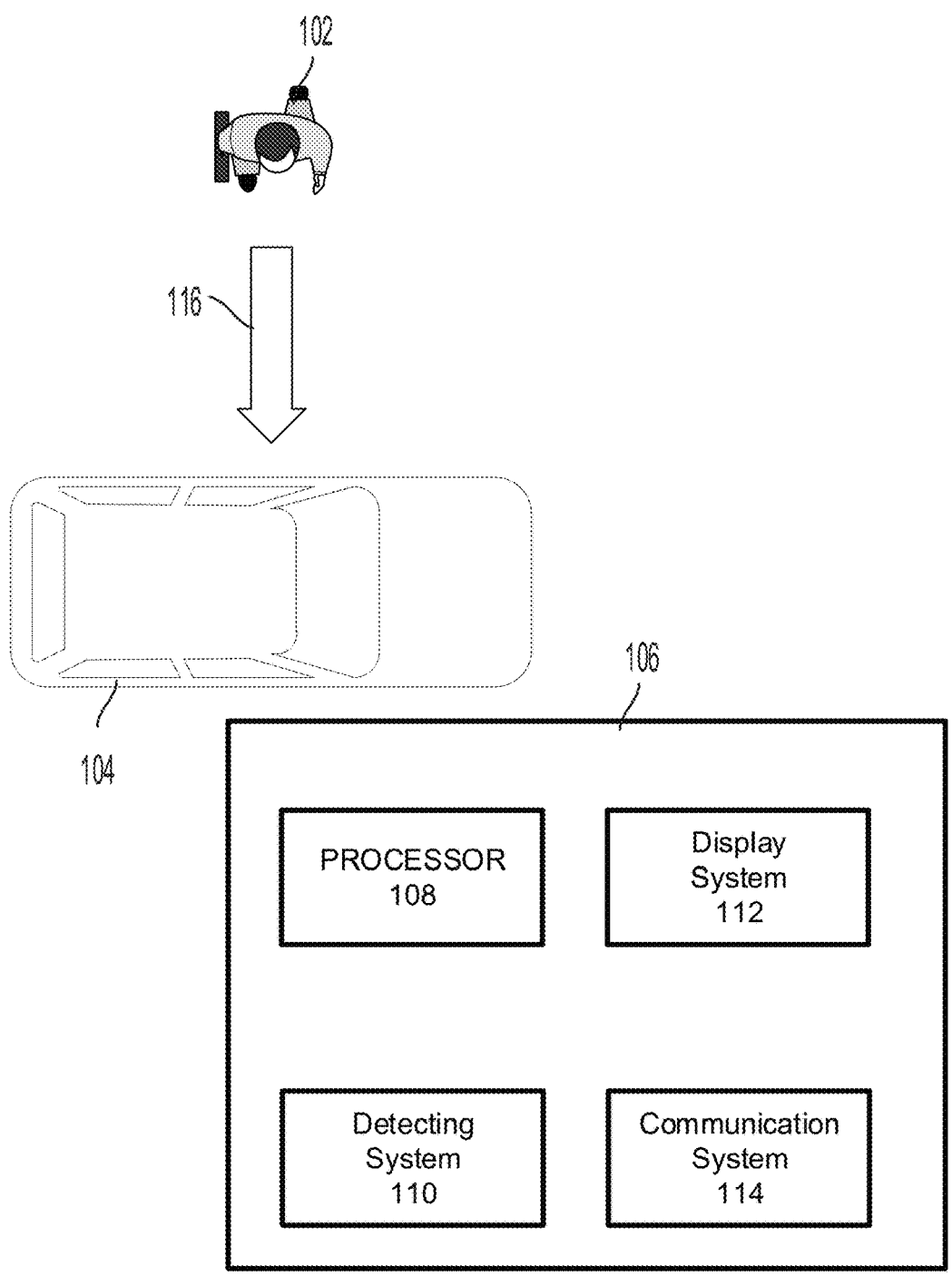
FIG. 1A illustrates an example system 100 for authenticating a person, of a transport, via the transport, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout least this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein), a data collection system, a data monitoring system, a verification system, an authorization system and a vehicle data distribution system. The vehicle status condition data, received in the form of communication update messages, such as wireless data network communications and/or wired communication messages, may be received and processed to identify vehicle/transport status conditions and provide feedback as to the condition changes of a transport. In one example, a user profile may be applied to a particular transport/vehicle to authorize a current vehicle event, service stops at service stations, and to authorize subsequent vehicle rental services.

Within the communication infrastructure, a decentralized database is a distributed storage system, which includes multiple nodes that communicate with each other. A blockchain is an example of a decentralized database, which includes an append-only immutable data structure (i.e., a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve cryptocurrencies and use consensus based on various protocols such as proof of work (PoW). On the other hand, a permissioned blockchain database provides a system, which can secure interactions among a group of entities, which share a common goal, but which do not or cannot fully trust one another, such as businesses that exchange funds, goods, information, and the like. The instant application can function in a permissioned and/or a permissionless blockchain setting.

Smart contracts are trusted distributed applications, which leverage tamper-proof properties of the shared or distributed ledger (i.e., which may be in the form of a blockchain) database and an underlying agreement between member nodes, which is referred to as an endorsement or endorsement policy. In general, blockchain entries are "endorsed" before being committed to the blockchain while entries that are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node, which submits an entry-invocation to an endorser (e.g., peer), and broadcasts entry-proposals to an ordering service (e.g., ordering node). Another type of node is a peer node, which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which is used to store an immutable, sequenced record in blocks. The ledger also includes a state database, which maintains a current state of the blockchain. There is typically one ledger per channel. Each peer node maintains a copy of the ledger for each channel of which they are a member.

A chain is an entry log, which is structured as hash-linked blocks, and each block contains a sequence of N entries, where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for providing a vehicle service to a particular vehicle and/or requesting user associated with a user profile that is applied to the vehicle. For example, a user may be the owner of a vehicle or the operator of a vehicle owned by another party. The vehicle may require service at certain intervals and the service needs may require authorization prior to permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more sensors, which report sensed data to a central controller computer device in the vehicle, which in turn, is forwarded to a management server for review and action.

A sensor may be located on one or more of the interior of the transport, the exterior of the transport, on a fixed object apart from the transport, and on another transport near to the transport. The sensor may also be associated with the transport's speed, the transport's braking, the transport's acceleration, fuel levels, service needs, the gear-shifting of the transport, the transport's steering, and the like. The notion of a sensor may also be a device, such as a mobile device. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

Every autonomous driving system is built on a whole suite of software and an array of sensors. Machine learning, lidar projectors, radar, and ultrasonic sensors all work together to create a living map of the world that a self-driving car can navigate. Most companies in the race to full autonomy are relying on the same basic technological foundations of lidar+radar+cameras+ultrasonic, with a few notable exceptions.

In another embodiment, GPS, maps and other cameras and sensors are used in autonomous vehicles without lidar as lidar is often viewed as being expensive and unnecessary. Researchers have determined that stereo cameras are a low-cost alternative to the more expensive lidar functionality.

The instant application includes, in certain embodiments, authorizing a vehicle for service via an automated and quick authentication scheme. For example, driving up to a charging station or fuel pump may be performed by a vehicle operator and the authorization to receive charge or fuel may be performed without any delays provided the authorization is received by the service station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the transport and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

The transport industry is striving to make functions of transports more automated, including accessibility into a transport. However, automating the granting of access to a transport has yet been fully realized, as there must be some type of verification that a person is associated with the transport in order to grant such access. Typically, this verification takes the form of the person having possession of a key or fob of the transport. Yet there are times when a person may lose a key or fob, or worse, the key or fob fails to work to grant access to the transport. Further, it is cumbersome to carry a key or fob. Therefore, what is needed is a solution that overcomes these drawbacks and limitations.

The present disclosure is drawn to recognizing that an individual is associated with a transport, as the individual approaches the transport, by using sensors on the transport. The present disclosure utilizes multiple elements of verification, or n-factor authentication, as described below.

Using n-factor authentication, an individual's entry into transport may be based on body movement (not just gait), along with other types of verification such as requiring the individual to perform an action on a device associated with the individual. This may occur when sensors on the transport detect the individual approaching the transport. Additional verification functions may be provided to the individual. When the requested functions are performed, the multi-factor authentication is made, and access to the transport is enabled.

In some embodiments, the transport may indicate (for example, visually, audibly, etc.) on or from the transport for an action the individual needs to perform (that was prerecorded) and verifies that it is the correct action.

In some embodiments, the transport may require a voice print and ask for any word in real time (i.e. not prerecorded) to authenticate the individual.

In some embodiments, a transport detects (via sensors) that a person is approaching the transport. A first authentication is performed, wherein the transport, using the sensors and transport processor, verifies that the person is associated with the transport by comparing the movements of the individual (such as gait). A second authentication is performed where the transport sends an action for the individual to perform, such as the reception of a voice print. When the second authentication is validated, the individual is fully authenticated and provided access to the transport.

In some embodiments, a transport may additionally determine that a person is carrying something, such as shopping bags, and automatically open the trunk along with a first event of unlocking a door.

FIG. 1A illustrates an example system 100 for authenticating a person 102, of a transport 104, via the transport 104, according to example embodiments. Referring to FIG. 1A, the person 102 is approaching the transport 104. The transport 104 includes a plurality of systems, graphically indicated by box 106, which include a processor 108, a detecting system 110, a display system 112 and a communication system 114.

In this example, the processor 108, the detecting system 110, the display system 112 and the communication system 114 are illustrated as individual devices. However, in some embodiments, at least two of the processor 108, the detecting system 110, the display system 112 and the communication system 114 may be combined as a unitary device. Further, in some embodiments, the processor 108 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

In operation, the transport 104 determines that the person 102 seeks access to the transport. This may be performed by the detecting system 110. Non-limiting examples of the detecting system 110 include imaging systems, sound detecting systems, heat detecting systems and biometric detecting systems. In some embodiments, the detecting system 110 is operable to detect a motion of the person via a first imaging system, detect a sound of the person via a sound detecting system, detect a position of the person via a second imaging system, detect a position of a part of the person via a third imaging system, detect a change in an actuator of the transport and combinations thereof.

In some embodiments, with respect to image detection, detecting system 110 may be operable to detect parameters of the person 102, such as the location of the person, the velocity of the person, the acceleration of the person, the gait of the person and biometric parameters of the person, e.g., facial features, eye features, fingerprints and handprints. The detection of the person 102 is illustrated in FIG. 1A as arrow 116.

In some embodiments, with respect to audible detection, detecting system 110 may be operable to detect words for word recognition and speech for speech recognition.

Detecting system 110 may then provide signals that are associated with the detected parameters of the person 102 to the processor 108. The processor 108 may then determine that the person seeks access to the transport.

In some non-limiting example embodiments, the processor 108 may determine that the person 102 seeks access to the transport by standing near a predetermined portion of the transport, e.g., the driver's side door as detected by detecting system 110. In other non-limiting example embodiments, the processor 108 may determine that the person 102 seeks access to the transport by touching a predetermined portion of the transport, e.g., the driver's side door handle as detected by detecting system 110. In still other non-limiting example embodiments, the processor 108 may determine that the person 102 seeks access to the transport by performing a predetermined detectable action, e.g., waving at the transport 104, pointing at the transport 104, saying a command to the transport and combinations thereof, as detected by detecting system 110.

Once it is determined that the person 102 seeks access to the transport 104, the transport 104 may visually indicate an action for the person to perform.

For example, the processor 108 may generate a visual indication signal to instruct the display system 112 to display an image that is associated with an action that the person 102 is required to perform in order to gain access to the transport 104.

In some embodiments, the display system 112 may include an infotainment screen that may be located on the dashboard or central console of the transport. In some embodiments, the display system 112 may include a display on an outer portion of the transport. In some embodiments, the display system 112 may include a projector that is operable to project an image onto at least one of the windshield and a window of the transport 104. An example embodiment, wherein the display system 112 projects an image onto the driver's side window, will now be described with reference to FIG. 1B.

Figure 1B:
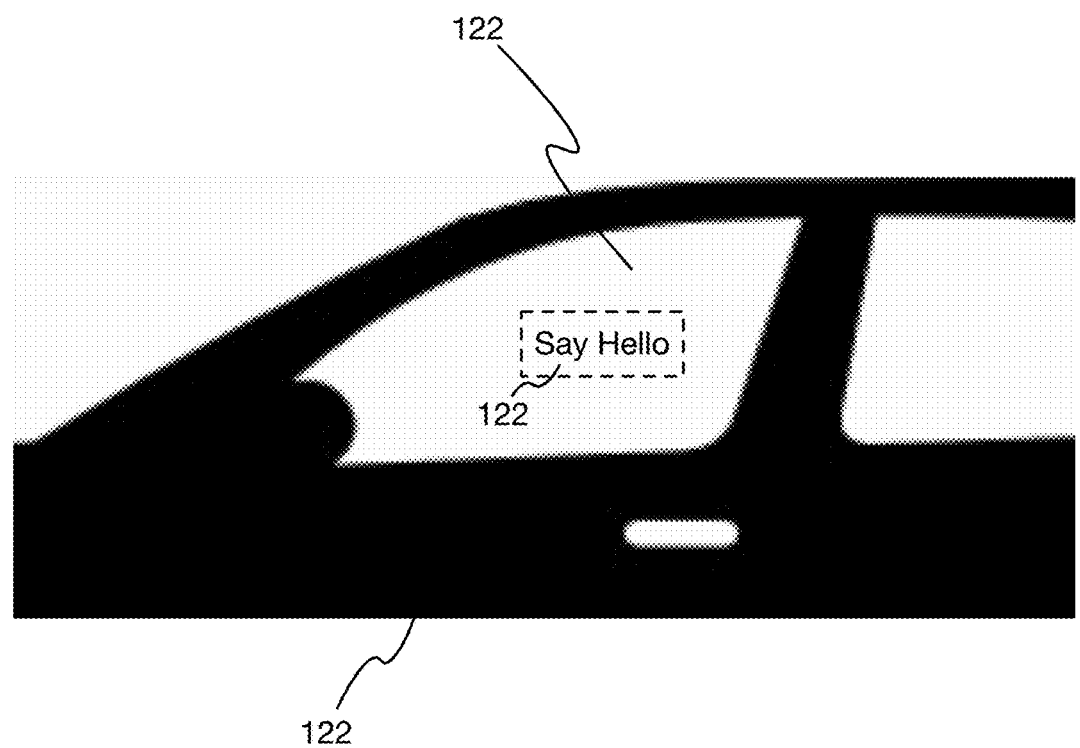
FIG. 1B illustrates a side view of a portion of the transport of FIG. 1A.

FIG. 1B illustrates a side view 120 of a portion 122 of the transport 104 of FIG. 1A. Referring to FIG. 1B, the transport 104 includes a side window 124, which includes a display area 126. In this non-limiting example, the display area 126 has the phrase "Say Hello" displayed therein.

In this example, the display system has displayed the phrase "Say Hello" onto the driver's side window 124 so that the person 102 can read the instruction. Thus, the transport visually indicates an action for the person 102 to perform. It should be noted that this is a non-limiting example provided merely for purposes of explanation. The action that may be needed to be performed by the person 102 may be a motion action, a verbal action and combinations thereof.

The processor 108 may have stored therein a database of parameter signatures that may be associated with granting access to the transport 104. This will be described in more detail with reference to FIG. 1C.

Figure 1C:
FIG. 1C illustrates a displayed image/required response look-up table, according to example embodiments.
Figure 1C:
Figure 1C:

FIG. 1C illustrates an example displayed image/required response look-up table 130, according to example embodiments. Referring to FIG. 1C, the look-up table 130 includes a displayed image column 132 and a required response column 134.

In some embodiments, the image to be displayed by the display system 112 may convey a direct instruction for the person 102 to say something. For example, item 136 indicates that the displayed image will be "Say Hello," wherein item 138 indicates that the required response from the person is a vocal pronouncement "Hello." Further stored within a memory of processor 108 are signatures corresponding to acceptable vocal pronouncements of "Hello." Any received signals from detecting system 110 for a vocal "Hello" would be correlated with the previously stored signatures corresponding to the acceptable vocal pronouncements. If a correlation reaches a predetermined threshold, then the detected vocal "Hello" will be determined to be a match, and therefore an acceptable received action.

In some embodiments, the image to be displayed by the display system 112 may convey a direct instruction for the person 102 to perform. For example, item 140 indicates that the displayed image will be "Tap Handle," wherein item 142 indicates that the required response from the person is a tap on the door handle. Further stored within a memory of processor 108 are signatures corresponding to acceptable taps that would be detected on the door handle. Any received signals from detecting system 110 for tap on the door handle would be correlated with the previously stored signatures corresponding to the acceptable door handle taps. If a correlation reaches a predetermined threshold, then the detected door handle tap will be determined to be a match, and therefore an acceptable received action.

In some embodiments, the image to be displayed by the display system 112 may indirectly instruct the person 102 to say something. For example, item 144 indicates that the displayed image will be an image of an apple, wherein item 146 indicates that the required response from the person is a vocal pronouncement "Apple." Further stored within a memory of processor 108 are signatures corresponding to acceptable vocal pronouncements of "Apple." Any received signals from detecting system 110 for a vocal "Apple" would be correlated with the previously stored signatures corresponding to the acceptable vocal pronouncements. If a correlation reaches a predetermined threshold, then the detected vocal "Apple" will be determined to be a match, and therefore an acceptable received action.

In some embodiments, the image to be displayed by the display system 112 may be a private key that will instruct the person 102 to say something. For example, item 148 indicates that the displayed image will be an image of a soccer ball, wherein item 150 indicates that the required response from the person is a vocal pronouncement "Larry." Further stored within a memory of processor 108 are signatures corresponding to acceptable vocal pronouncements of "Larry." Any received signals from detecting system 110 for a vocal "Larry" would be correlated with the previously stored signatures corresponding to the acceptable vocal pronouncements. If a correlation reaches a predetermined threshold, then the detected vocal "Larry" will be determined to be a match, and therefore an acceptable received action. In this case, the soccer ball is a public key, in that the image might be viewed by other people. However, the vocal pronouncement "Larry," is the private key because only those people with previously determined access to the transport 104 would have known the private key. In some embodiments, these private/public key pairs may have been previously created by the person 102 using a user interface (not shown) in the transport 104. By using such a private/public key pair, someone without knowledge of the private key will not be granted access to the transport.

In some embodiments, the image to be displayed by the display system 112 may be a private key that will instruct the person 102 to do something. For example, item 152 indicates that the displayed image will be an image of a jet, wherein item 154 indicates that the required response from the person is handle tap. Further stored within a memory of processor 108 are signatures corresponding to acceptable taps that would be detected on the door handle. Any received signals from detecting system 110 for tap on the door handle would be correlated with the previously stored signatures corresponding to the acceptable door handle taps. If a correlation reaches a predetermined threshold, then the detected door handle tap will be determined to be a match, and therefore an acceptable received action. In this case, the jet is a public key, in that the image might be viewed by other people. However, the tapping of the door handle is the private key because only those people with previously determined access to the transport 104 would have known the private key. In some embodiments, these private/public key pairs may have been previously created by the person 102 using a user interface (not shown) in the transport 104. By using such a private/public key pair, someone without knowledge of the private key will not be granted access to the transport.

It should be noted that more than one displayed image and corresponding required response may be used in accordance with aspects of the present disclosure. Each additional displayed image and corresponding required response, up to a predetermined integer number n, provides an n-factor authorization for access to the transport 104.

Once the transport 104 visually indicates an action for the person 102 to perform, and the person performs the action, the transport 104 receives the action.

In some embodiments, the detecting system 110 may detect the actions performed by the person 102. Once detected, the detecting system 110 provides action detection signals to the processor 108, wherein the action detection signals correspond to the detected parameters of the performed action.

For example, in the non-limiting example embodiment of the displayed image being an image "Say Hello" corresponding to item 136 in FIG. 1C, if the person 102 says "Hello," then the detecting system 110 will be operable to detect the audible announcement. In some embodiments, the detecting system 110 is operable to detect whether the word "Hello" was announced. In some embodiments, the detecting system 110 is operable to detect the correct voice of the person 102 saying "Hello."

Once the action is received, the detecting system 110 will provide a signal corresponding to the detected parameter to the processor 108, so that the processor may determine whether the detected parameter matches the required response as indicated in item 138 of look-up table 134. If the detected parameter matches the required response, then the processor 108 may validate that the person is associated with the transport 104.

In the non-limiting example embodiment of the displayed image being an image "Tap Handle" corresponding to item 140 in FIG. 1C, if the person 102 taps the door handle, then the detecting system 110 is operable to detect tapping. In some embodiments, a predetermined number of taps of the handle, or a predetermined rhythm of tapping may need to be detected by the detecting system 110.

Once the action is received, the detecting system 110 will provide a signal corresponding to the detected parameter to the processor 108, so that the processor may determine whether the detected parameter matches the required response as indicated in item 142 of look-up table 134. If the detected parameter matches the required response, then the processor 108 may validate that the person is associated with the transport 104.

In the non-limiting example embodiment of the displayed image being an image of the apple corresponding to item 144 in FIG. 1C, if the person 102 says "apple," then the detecting system 110 will detect the audible announcement. In some embodiments, the detecting system 110 is operable to detect whether the word "apple" was announced. In some embodiments, the detecting system 110 is operable to detect the correct voice of the person 102 saying "apple."

Once the action is received, the detecting system 110 will provide a signal corresponding to the detected parameter to the processor 108, so that the processor may determine whether the detected parameter matches the required response as indicated in item 146 of look-up table 134. If the detected parameter matches the required response, then the processor 108 may validate that the person is associated with the transport 104.

In the non-limiting example embodiment of the displayed image being an image of the soccer ball corresponding to item 148 in FIG. 1C, if the person 102 says "Larry," then the detecting system 110 will detect the audible announcement. In some embodiments, the detecting system 110 is operable to detect whether the word "Larry" was announced. In some embodiments, the detecting system 110 is operable to detect the correct voice of the person 102 saying "Larry."

Once the action is received, the detecting system 110 will provide a signal corresponding to the detected parameter to the processor 108, so that the processor may determine whether the detected parameter matches the required response as indicated in item 150 of look-up table 134. If the detected parameter matches the required response, then the processor 108 may validate that the person is associated with the transport 104.

In the non-limiting example embodiment of the displayed image being an image of a jet corresponding to item 152 in FIG. 1C, if the person 102 taps the door handle, then the detecting system 110 is operable to detect tapping. In some embodiments, a predetermined number of taps of the handle, or a predetermined rhythm of tapping may need to be detected by the detecting system 110.

Once the action is received, the detecting system 110 will provide a signal corresponding to the detected parameter to the processor 108, so that the processor may determine whether the detected parameter matches the required response as indicated in item 154 of look-up table 134. If the detected parameter matches the required response, then the processor 108 may validate that the person is associated with the transport 104.

As mentioned previously, the transport may display a second action for the person to perform, or even more actions, based on the first validation that the person is associated with the transport. Accordingly, in a manner similar to the non-limiting example embodiments discussed above, the transport may receive corresponding additional actions based on the respective displayed actions. Receiving and validating additional actions will further validate that the person 102 is associated with the transport 104.

After the person 102 is validated to be associated with the transport 104, the transport 104 may perform a transport action. In other words, the transport 104 may perform a transport action based on an action performed by the person 102 and detected by the transport 104. Non-limiting examples of transport actions include the processor 108 generating a transport action signal to instruct the transport 104 to unlock the doors to provide access to the transport 104, the processor 108 generating a transport action signal to instruct the transport 104 to open the trunk, the processor 108 generating a transport action signal to instruct the transport 104 to flash the lights, the processor 108 generating a transport action signal to instruct the transport 104 to honk the horn, the processor 108 generating a transport action signal to instruct the transport 104 to start and combinations thereof.

There may be situations wherein the transport 104 is unable to validate the person 102 based the person 102 providing an inaccurate or inappropriate response to a displayed instruction. For example, the person 102 may have forgotten that the appropriate response for the display of the soccer ball as indicated in item 148 of FIG. 1C is a vocal annunciation, "Larry." Further, there may be situations wherein the transport 104 is unable to validate the person 102 based on the detection system 110 not functioning properly or not being sufficiently sensitive to recognize the person 102 or a response provided by the person 102. As such, in accordance with other aspects of the present disclosure, the transport might enable an override.

In particular, suppose for purposes of discussion that the display system 112 displays an action for the person 102 to perform, such as a displayed instruction "Say Hello." Further, let the person 102 say "hello," but the detecting system 110 is unable to detect the announcement. In such a situation, the transport 104 might not validate the person 102 as being associated with the transport 104 and thereby provide access to the transport 104. In such a situation, the person 102 may actuate an override of the declined validation by performing an override action. Such an override action may be predetermined and stored in a memory of processor 108. The override action may be detected by detecting system 110 in a manner as discussed above with respect to detection of other actions.

After the person 102 performs the override action, and detection system 110 detects the override action, then the display system 112 may display a new action for the person 102 to perform in order to validate that the person 102 is associated with the transport 104.

There may be situations where a transport is unable to determine that a person seeks access to the transport. For example, in situations where the transport is unable to detect the person approaching the transport, and detection of such an approach is the basis of determining that the person seeks access to the transport. In such situations, the transport may rely on the detection of the person by other transports, as will be described in detail below with reference to FIGS. 1D-E.

Figure 1D:
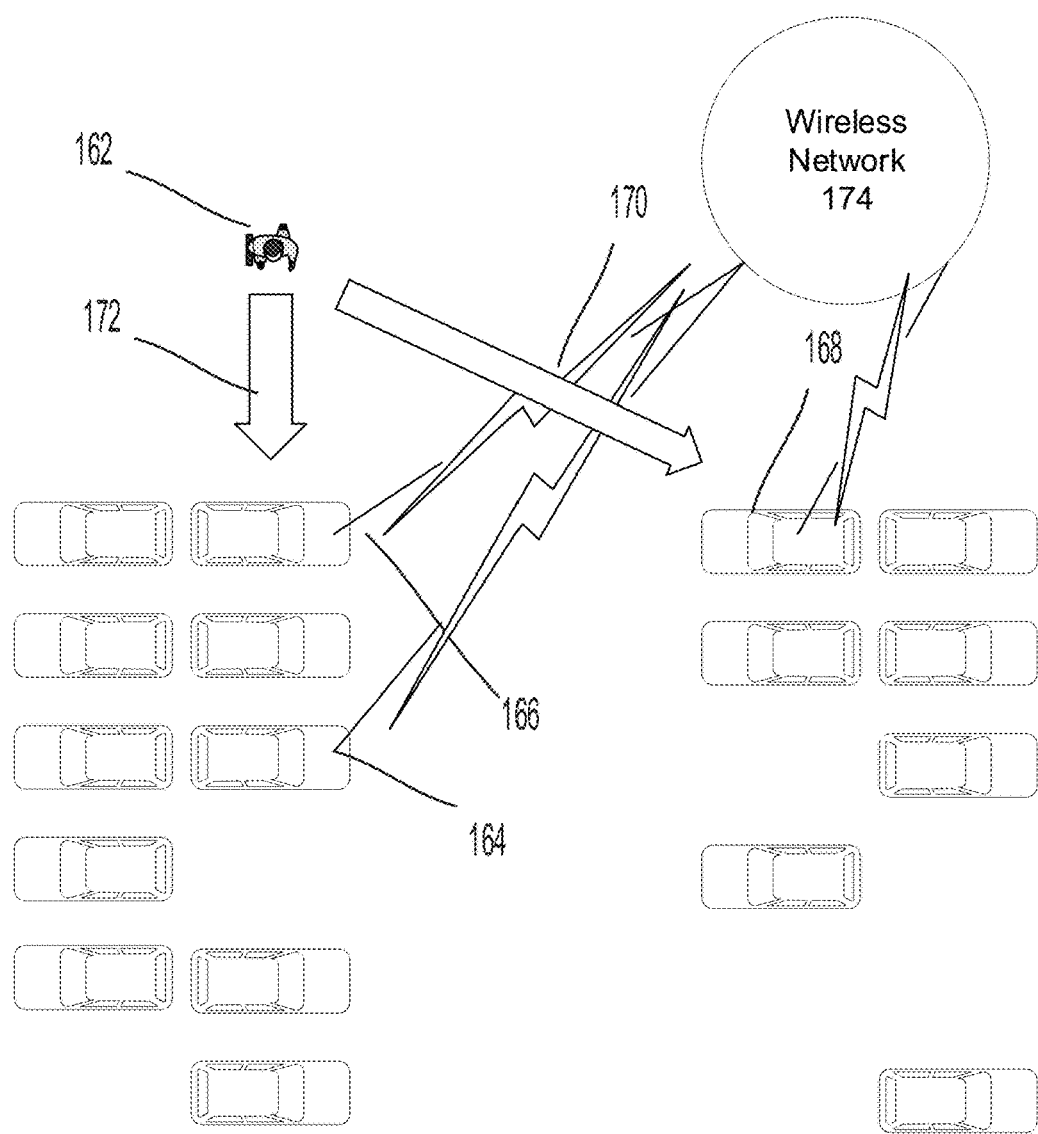
FIG. 1D illustrates an example system for authenticating a person, of a transport, via a second transport and a third transport at a time $t_0$, according to example embodiments.

FIG. 1D illustrates an example system 160 for authenticating a person 162, of a transport 164, via a transport 166 and a transport 168 at a time $t_0$, according to example embodiments. Referring to FIG. 1D, the person 162 is approaching the transport 164 by way of a pathway in which the line of sight between the person 162 and the transport 164 is blocked by a plurality of cars in a parking lot. Within the plurality of cars are included the transport 166 and the transport 168.

Suppose that each of the transports within FIG. 1D includes a respective processor, detecting system, display system and communication system as the transport 104 of FIG. 1A. Further, suppose that because the line of sight of the person 162 and the transport 164 is blocked by multiple other transports, that a detector system (not shown) of the transport 164 is unable to determine a location or velocity of the person 162. Still further, suppose that the transport 164 would be able to determine whether the person 162 seeks access into the transport 164 based on the determined location and velocity of the person 162. In such a situation, the transport 164 may rely on other transports to determine the location and velocity of the person 162, so that the transport 164 may determine whether the person 162 seeks access to the transport 164. In accordance with aspects of the present disclosure, other transports, such as transport 166 and transport 168 may determine the location and velocity of the person 162 and provide this information to the transport 164.

As shown in the figure, transport 166 detects the person 162 as indicated by arrow 172. Transport 166 may detect the person 162 in a manner similar to that discussed above with reference to FIG. 1A. Similarly, transport 168 detects the person 162 as indicated by arrow 170. Transport 168 may detect the person 162 in a manner similar to that discussed above with reference to FIG. 1A. It should be noted that while in this non-limiting example embodiment only two transports detect the person 162, in accordance with aspects of the present disclosure, any number of transports may detect the person 162. Once other transports have detected person 162, they may provide the detected parameters associated with the person 162 to the transport 164. This will be described in reference to FIG. 1E.

Figure 1E:
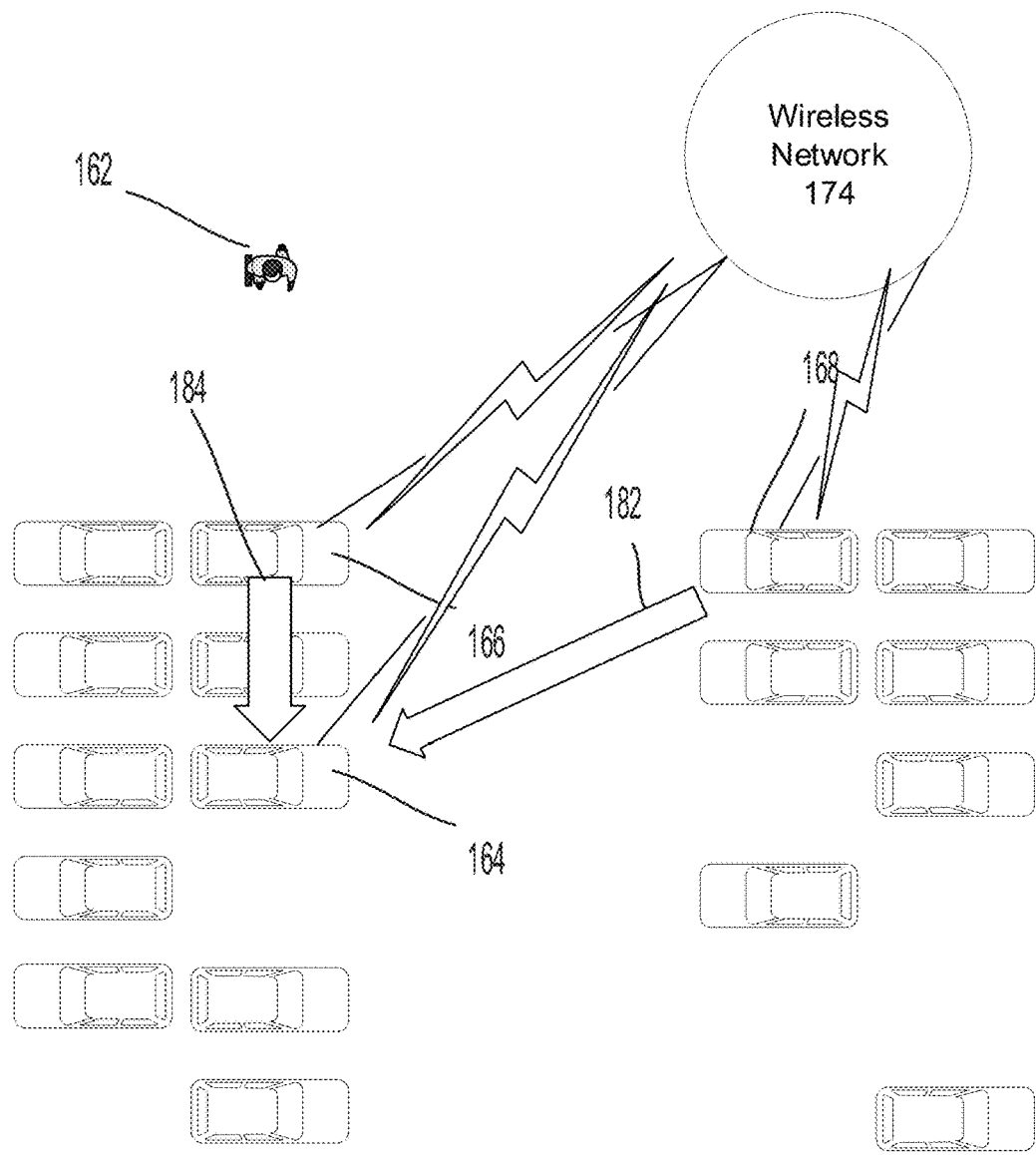
FIG. 1E illustrates an example system for authenticating a person, of a transport, via a second transport and a third transport at a time $t_1$, according to example embodiments.

FIG. 1E illustrates an example system 180 for authenticating a person 162, of a transport 164, via a transport 166 and a transport 168 at a time $t_2$, according to example embodiments. Referring to FIG. 1E, the transport 166 provides information related to the detected parameters associated with the person 162 to the transport 164 as an identity signal 184. Similarly, the transport 168 provides information related to the detected parameters associated with the person 162 to the transport 164 as an identity signal 182.

The identity signals 182 and 184 may be respectively provided directly to the transport 164 by way of a peer-to-peer wireless communication network. Alternatively, the transport 166 and the transport 168 may provide the identity signals 184 and 182, respectively, to the transport 164 by way of a wireless communication network 174, which may include a Wi-Fi, Bluetooth, cellular communication network or combination thereof. In an example embodiment, the transport 164 may communicate with transport 166 and transport 168 by way of communication system 114, as shown in FIG. 1A.

With a network communication system as shown in FIGS. 1D-E, the position and velocity of the person 162 may be triangulated multiple transports. The position and velocity of the person 162 may then be provided to the transport 164. In this manner, the transport 164 may be able to determine that the person 162 seeks access to the transport 164 well before the person 162 is next to the transport 164.

Further, in some embodiments of a network communication system as shown in FIGS. 1D-E, transport 164 uses information from at least one of the identity signals 182 and 184 to identify the person 162. Accordingly, the transport 164 may be able to validate that the person 162 is associated with the transport 164 using a lower threshold of actions. For example, for purposes of discussion, suppose that the transport 164 might require the person 162 to perform n actions for verification under the condition that the transport 164 determines that the person 162 seeks access, as discussed above with reference to FIGS. 1A-C. The additional information identifying the person 162 from at least one of the identity signals 182 and 184 may be used by the transport 164 to partially verify that the person 162 is associated with the transport 164. Accordingly, with the additional information identifying the person 162 from at least one of the identity signals 182 and 184, the transport 164 may require performance of less than n actions by the person 162 for verification. As a non-limiting example, presume that transport 164 might require the person 162 to perform three actions for verification under the condition that the transport 164 determines that the person 162 seeks access, as discussed above with reference to FIGS. 1A-C; wherein the three actions are 1) say "hello," 2) tap the door handle and 3) say "Larry." However, because the transport 164 had received the additional information identifying the person 162 from at least one of the identity signals 182 and 184, the transport 164 may require the person 162 to only perform one action for verification, wherein the one action is tapping the door handle.

Figure 2A:
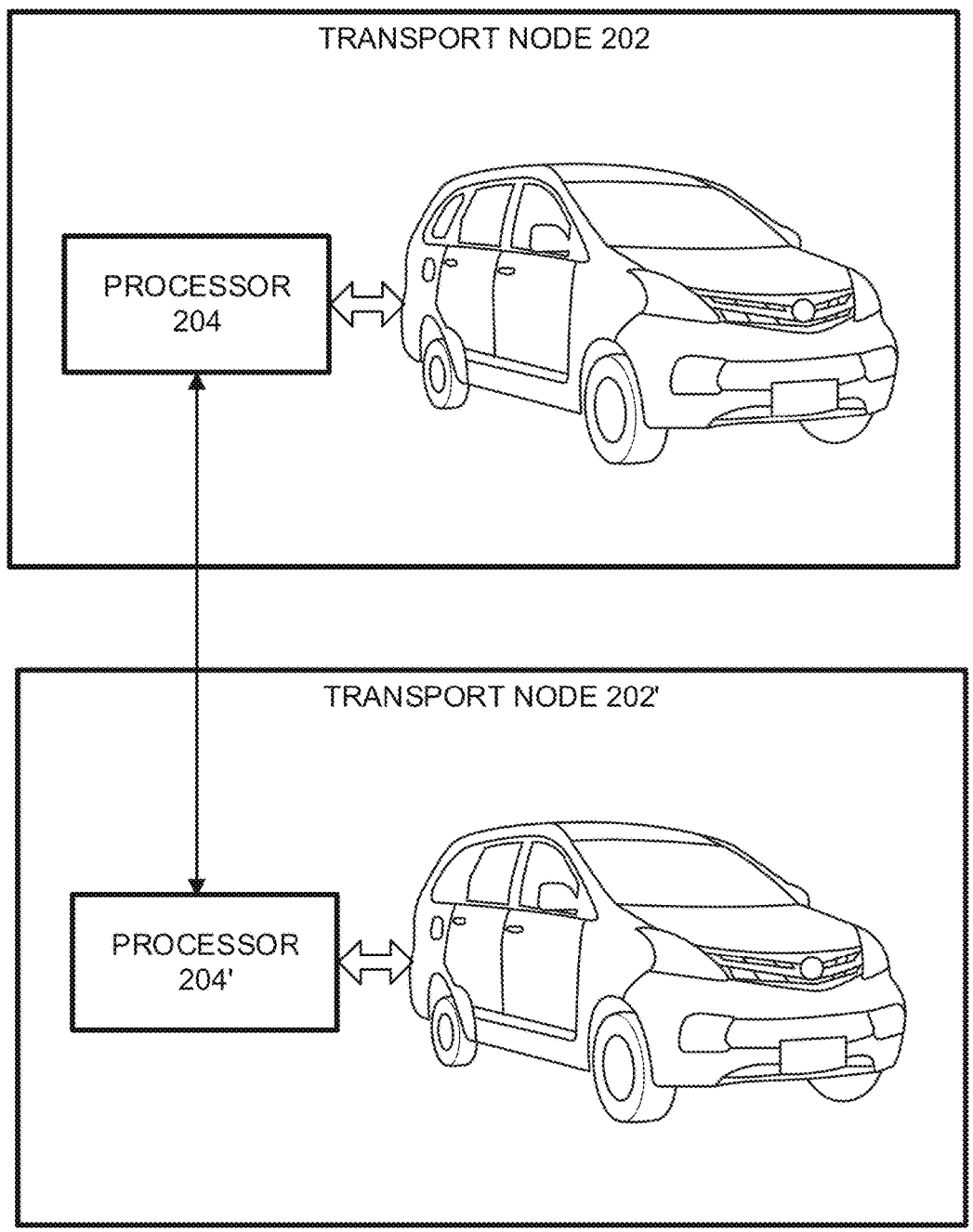
FIG. 2A illustrates a transport network diagram, according to example embodiments.

FIG. 2A illustrates a transport network diagram 200, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. Although depicted as single transport nodes and processors, a plurality of transport nodes and processors may be present. One or more of the applications, features, steps, solutions, etc., described and/or depicted herein may be utilized and/or provided by the instant elements.

Figure 2B:
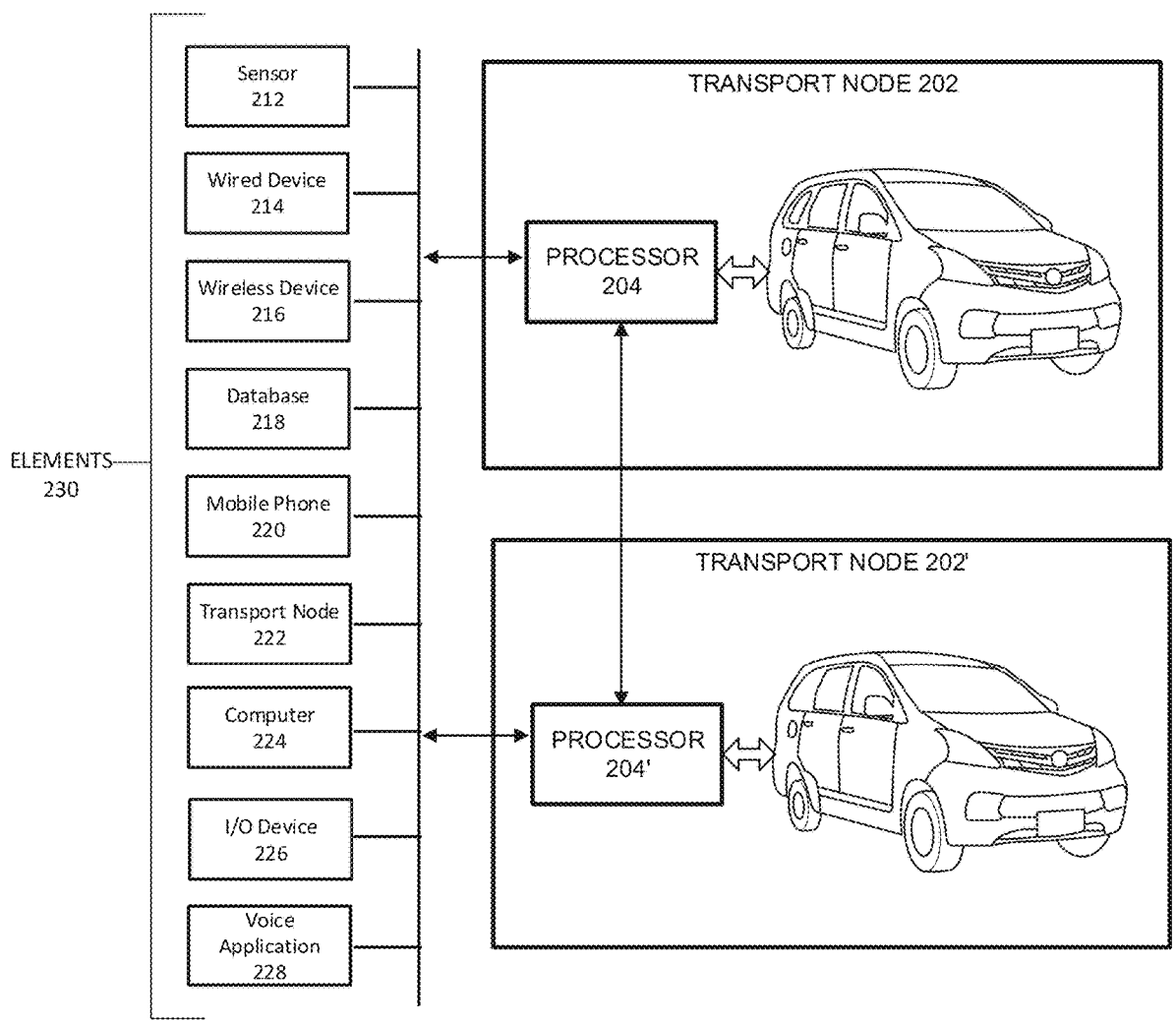
FIG. 2B illustrates another transport network diagram, according to example embodiments.

FIG. 2B illustrates another transport network diagram 210, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. The processors 204, 204' can further communicate with one or more elements 230 including sensor 212, wired device 214, wireless device 216, database 218, mobile phone 220, transport node 222, computer 224, I/O device 226 and voice application 228. The processors 204, 204' can further communicate with elements comprising one or more of a processor, memory, and software.

Although depicted as single transport nodes, processors and elements, a plurality of transport nodes, processors and elements may be present. Information or communication can occur to and/or from any of the processors 204, 204' and elements 230. For example, the mobile phone 220 may provide information to the processor 204, which may initiate the transport node 202 to take an action, may further provide the information or additional information to the processor 204', which may initiate the transport node 202' to take an action, may further provide the information or additional information to the mobile phone 220, the transport node 222, and/or the computer 224. One or more of the applications, features, steps, solutions, etc., described and/or depicted herein may be utilized and/or provided by the instant elements.

Figure 2C:
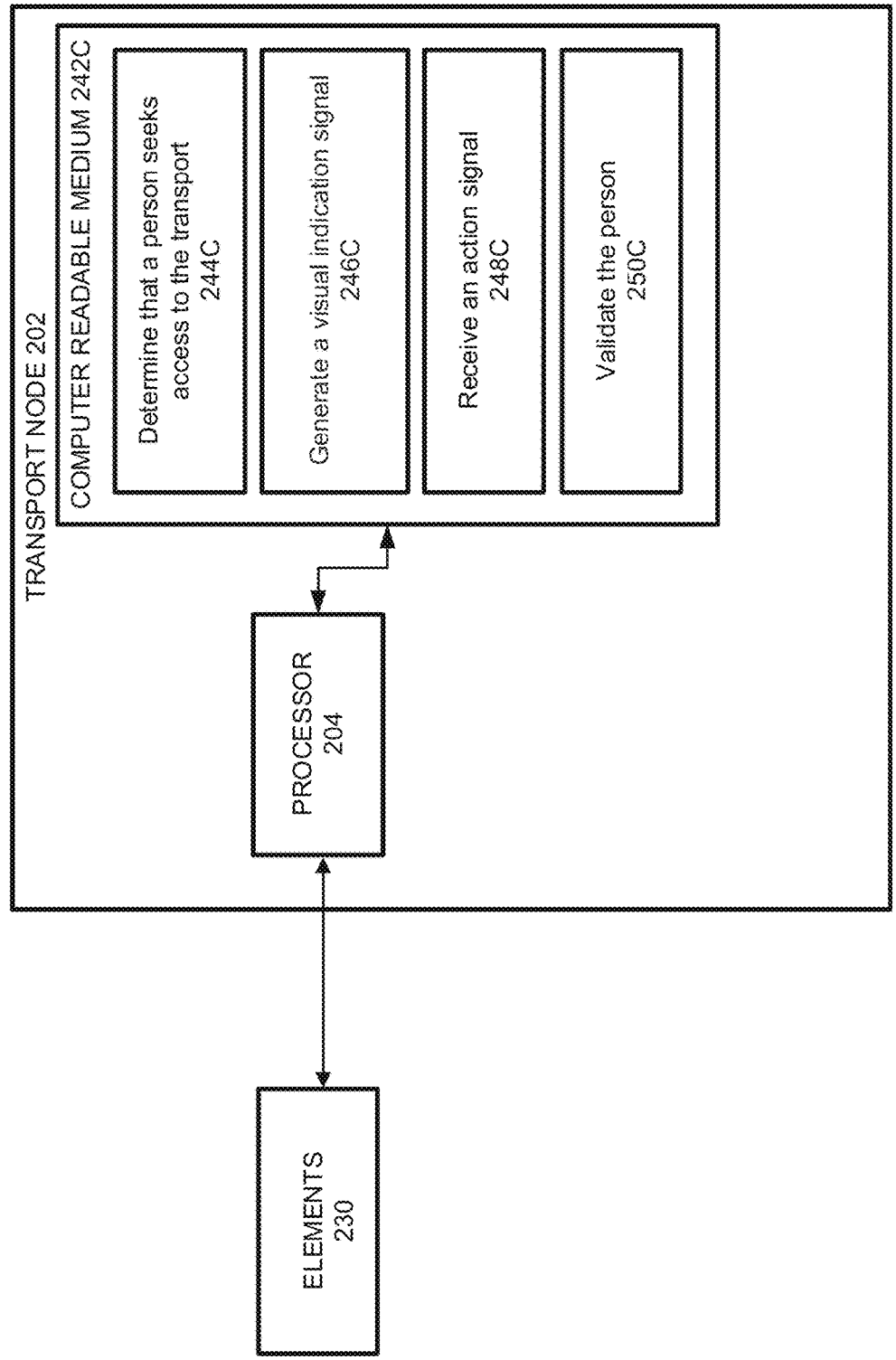
FIG. 2C illustrates yet another transport network diagram, according to example embodiments.

FIG. 2C illustrates yet another transport network diagram 240, according to example embodiments. The network comprises elements including a transport node 202 including a processor 204 and a non-transitory computer readable medium 242C. The processor 204 is communicably coupled to the computer readable medium 242C and elements 230 (which were depicted in FIG. 2B).

The processor 204 performs one or more of determine that a person seeks access to the transport (244C), generate a visual indication signal to instruct a display to display an image associated with action for the person to perform (246C), receive an action signal, from a detector, associated with detection of performance of the action (248C) and validate that the person is associated with the transport, based on the action signal (250C).

Figure 2D:
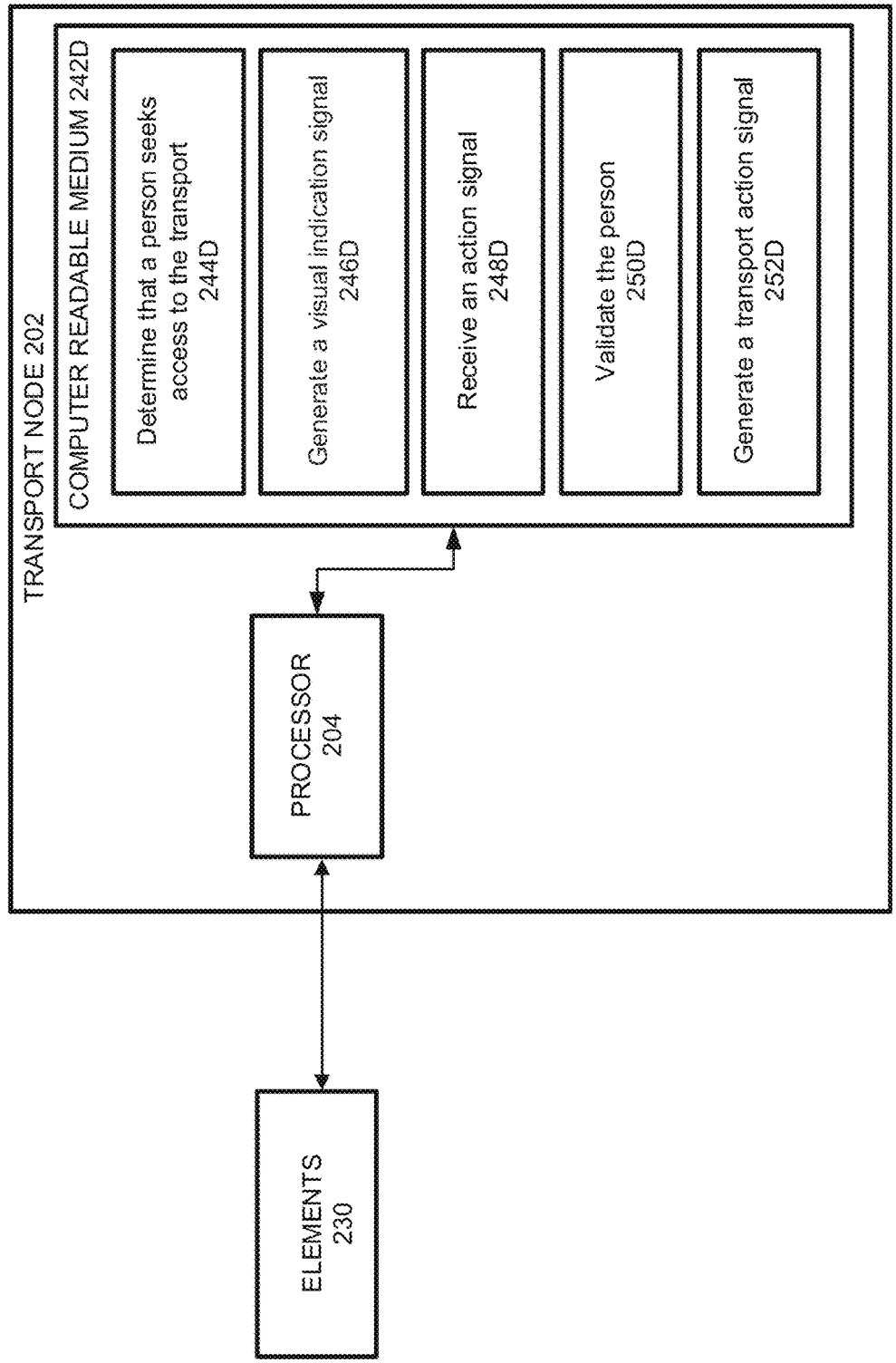
FIG. 2D illustrates still yet another transport network diagram, according to example embodiments.

FIG. 2D illustrates a further transport network diagram 260, according to example embodiments. The network comprises elements including a transport node 202 including a processor 204 and a non-transitory computer readable medium 242D. The processor 204 is communicably coupled to the computer readable medium 242D and elements 230 (which were depicted in FIG. 2B).

The processor 204 performs one or more of determine that a person seeks access to the transport (244D), generate a visual indication signal to instruct a display to display an image associated with action for the person to perform (246D), receive an action signal, from a detector, associated with detection of performance of the action (248D), validate that the person is associated with the transport, based on the action signal (250D) and generate a transport action signal based on the validating (252D), wherein the transport action signal is operable to instruct the transport to perform a transport action.

Figure 2E:
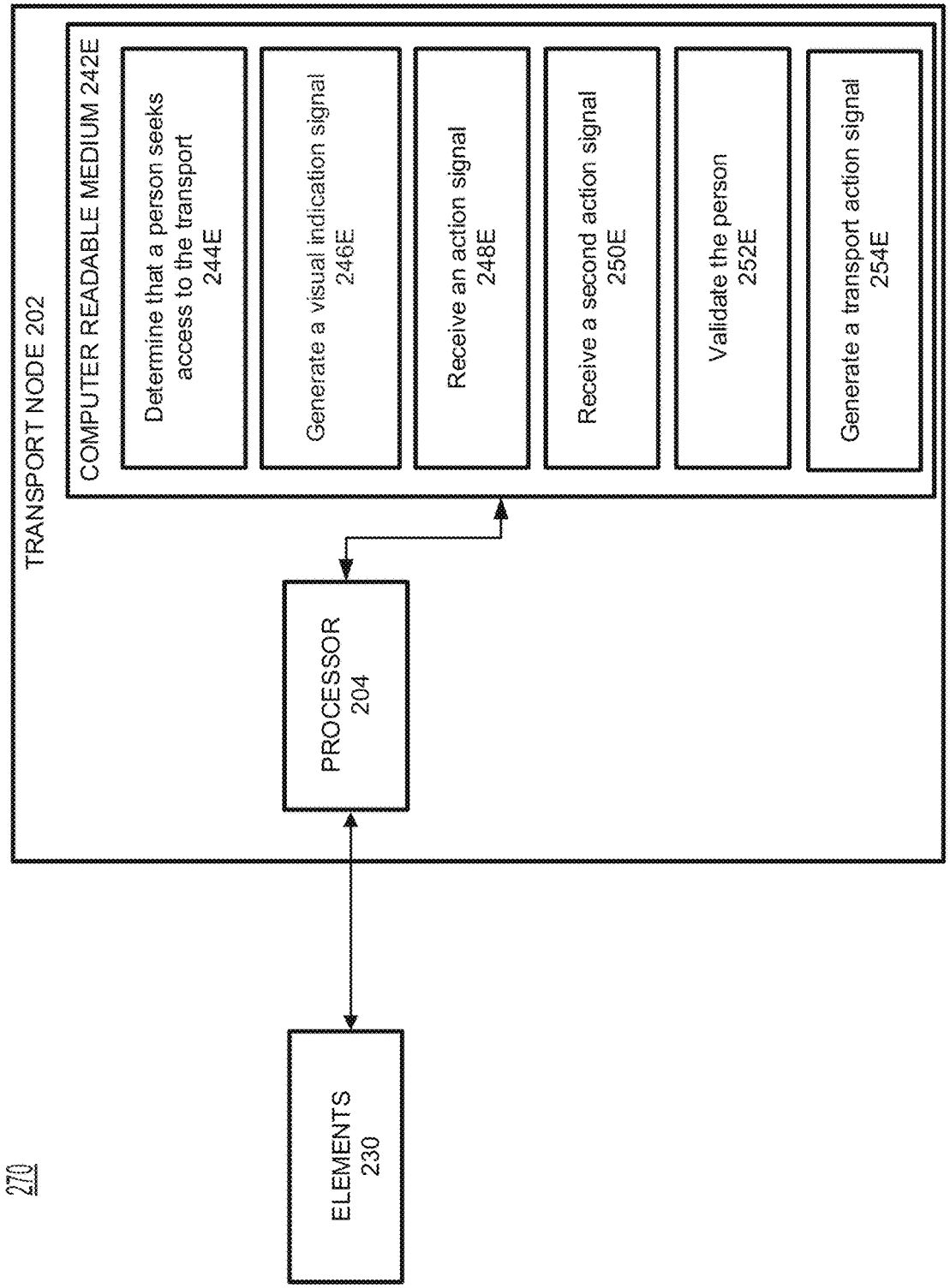
FIG. 2E illustrates a further transport network diagram, according to example embodiments.

FIG. 2E illustrates a yet further transport network diagram 270, according to example embodiments. The network comprises elements including a transport node 202 including a processor 204 and a non-transitory computer readable medium 242E. The processor 204 is communicably coupled to the computer readable medium 242E and elements 230 (which were depicted in FIG. 2B).

The processor 204 performs one or more of determine that a person seeks access to the transport (244E), generate a visual indication signal to instruct a display to display an image associated with action for the person to perform (246E), receive an action signal, from a detector, associated with detection of performance of the action (248E), receive a second action signal, from a second detector, associated with detection of performance of a second action (250E), validate that the person is associated with the transport, based on the action signal (252E) and generate a transport action signal based on the second action signal (254E), wherein the transport action signal is operable to instruct the transport to perform a transport action.

Figure 2F:
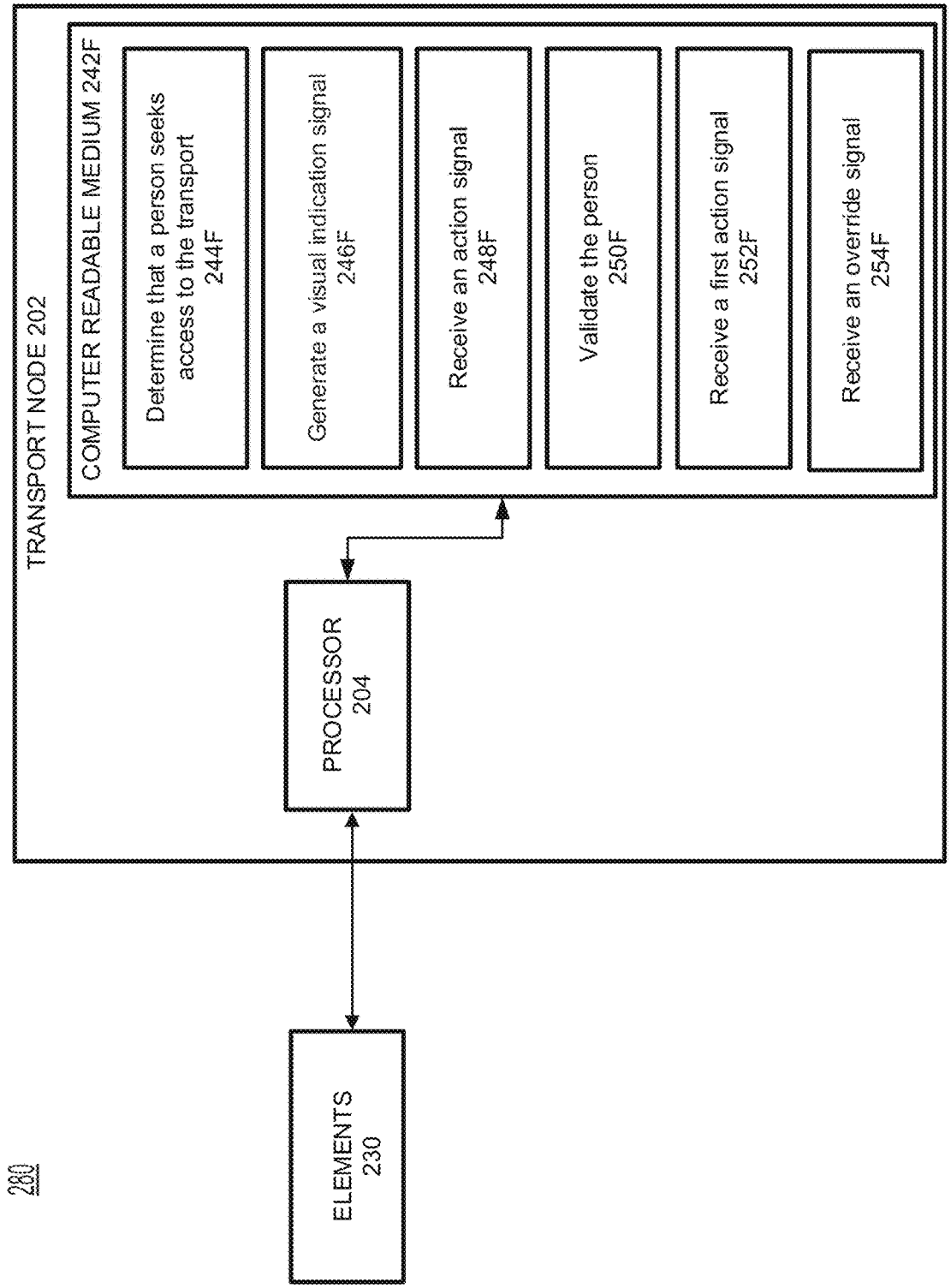
FIG. 2F illustrates yet a further transport network diagram, according to example embodiments.

FIG. 2F illustrates a yet further transport network diagram 280, according to example embodiments. The network comprises elements including a transport node 202 including a processor 204 and a non-transitory computer readable medium 242F. The processor 204 is communicably coupled to the computer readable medium 242F and elements 230 (which were depicted in FIG. 2B).

The processor 204 performs one or more of determine that a person seeks access to the transport (244F), generate a visual indication signal to instruct a display to display an image associated with action for the person to perform (246F), receive an action signal, from a detector, associated with detection of performance of the action (248F), validate that the person is associated with the transport, based on the action signal (250F), receive a first action signal, from a first detector, associated with detection of performance of a first action prior to receiving the action signal (252F) and receive an override signal, from a second detector, associated with detection of performance of an override action when the person is not validated to be associated with the transport, based on the first action signal (254F), wherein the processor is operable to generate a visual indication signal based on the override signal.

FIG. 2G illustrates a yet further transport network diagram 290, according to example embodiments. The network comprises elements including a transport node 202 including a processor 204 and a non-transitory computer readable medium 242G. The processor 204 is communicably coupled to the computer readable medium 242G and elements 230 (which were depicted in FIG. 2B).

The processor 204 performs one or more of determine that a person seeks access to the transport (244G), generate a visual indication signal to instruct a display to display an image associated with action for the person to perform (246G), receive an action signal, from a detector, associated with detection of performance of the action (248G), validate that the person is associated with the transport, based on the action signal (250G) and receive, from a second transport, an identity signal identifying and locating the person (252G).

The processors and/or computer readable media may fully or partially reside in the interior or exterior of the transport nodes. The steps or features stored in the computer readable media may be fully or partially performed by any of the processors and/or elements in any order. Additionally, one or more steps or features may be added, omitted, combined, performed at a later time, etc.

Figure 3A:
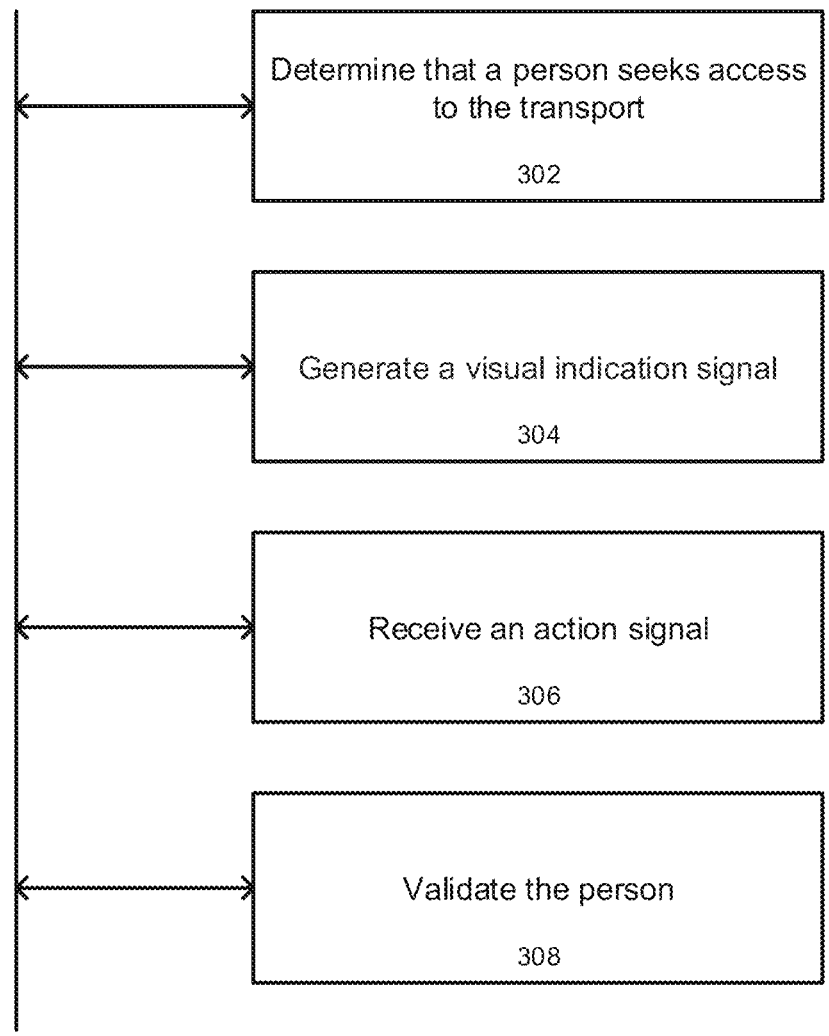
FIG. 3A illustrates a flow diagram, according to example embodiments.

FIG. 3A illustrates a flow diagram 300, according to example embodiments. Referring to FIG. 3A, at block 302, the processor 108 may determine that the person 102 seeks access to the transport as shown in FIG. 1A. This determination may be performed by the processor 108 receiving a signal, from detecting system 110, that is associated with the detected parameters of the person 102. At block 304, the processor 108 may generate a visual indication signal. As discussed above, the processor 108 may generate a visual indication signal to instruct the display system 112 to display an image that is associated with an action that the person 102 is required to perform in order to gain access to the transport 104. At block 306, the processor 108 may receive an action signal 306. As discussed above, the detecting system 110 may detect the actions performed by the person 102. Once detected, the detecting system 110 provides action detection signals to the processor 108, wherein the action detection signals correspond to the detected parameters of the performed action. At block 308, the processor 108 may validate the identity of the person 102. As discussed above, the detecting system 110 will provide a signal corresponding to the detected parameter to the processor 108, so that the processor may determine whether the detected parameter matches the required response as indicated in item 138 of look-up table 134. If the detected parameter matches the required response, then the processor 108 may validate that the person is associated with the transport 104.

Figure 3B:
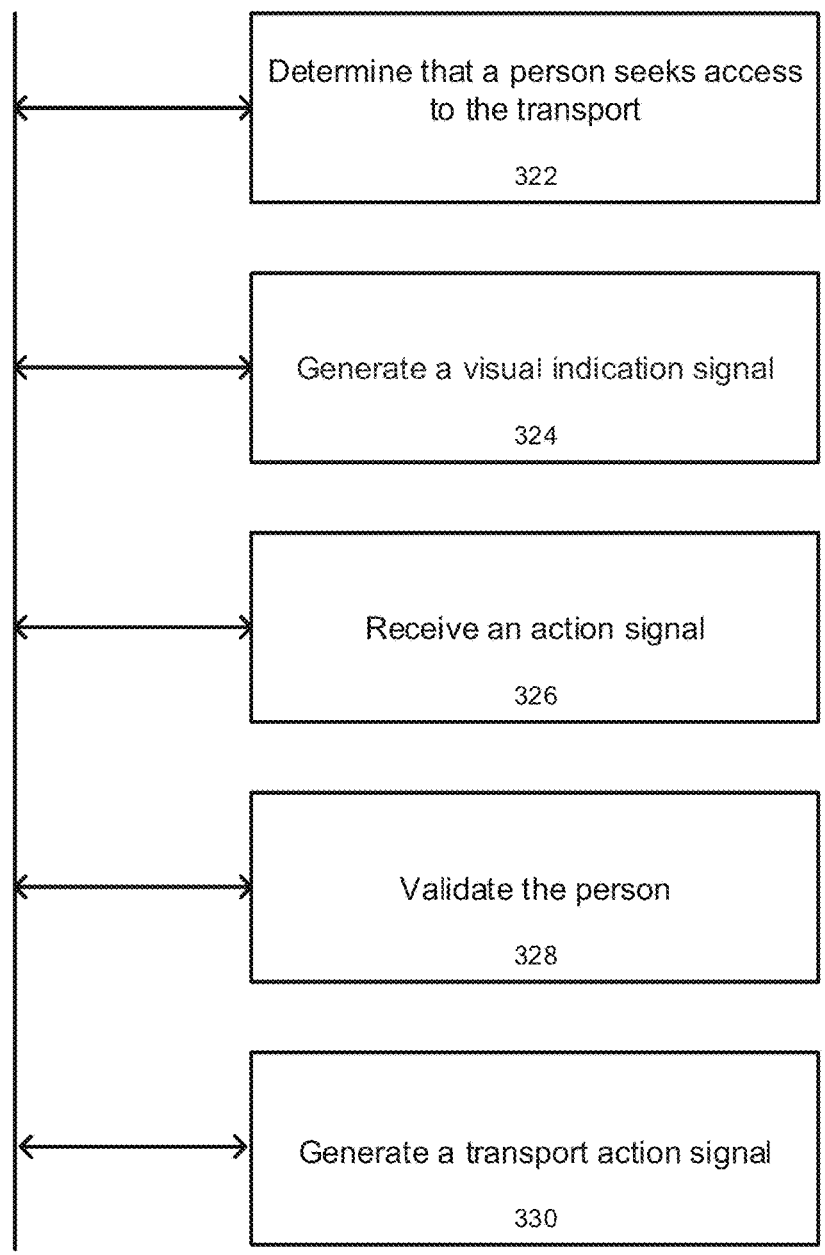
FIG. 3B illustrates another flow diagram, according to example embodiments.

FIG. 3B illustrates another flow diagram 320, according to example embodiments. Referring to FIG. 3B, an example method may be executed by the processor 108 (see FIG. 1A). It should be understood that the method 320 depicted in FIG. 3B may include additional operations and that some of the operations described therein may be removed and/or modified without departing from the scope of the method 320.

With reference to FIG. 3B, at block 322, the processor 108 may determine that the person 102 seeks access to the transport as shown in FIG. 1A. This determination may be performed in a manner similar to block 302 as discussed above with reference to FIG. 3A. At block 324, the processor 108 may generate a visual indication signal. This determination may be performed in a manner similar to block 304 as discussed above with reference to FIG. 3A. At block 326, the processor 108 may receive an action signal 306. This determination may be performed in a manner similar to block 306 as discussed above with reference to FIG. 3A. At block 328, the processor 108 may validate the identity of the person 102. This determination may be performed in a manner similar to block 308 as discussed above with reference to FIG. 3A. At block 330, the processor 108 may generate a transport action signal. As discusses above, this generation may include generating a transport action signal to instruct the transport 104 to unlock the doors, to open the trunk, to flash the lights, to honk the horn, to start and combinations thereof.

Figure 3C:
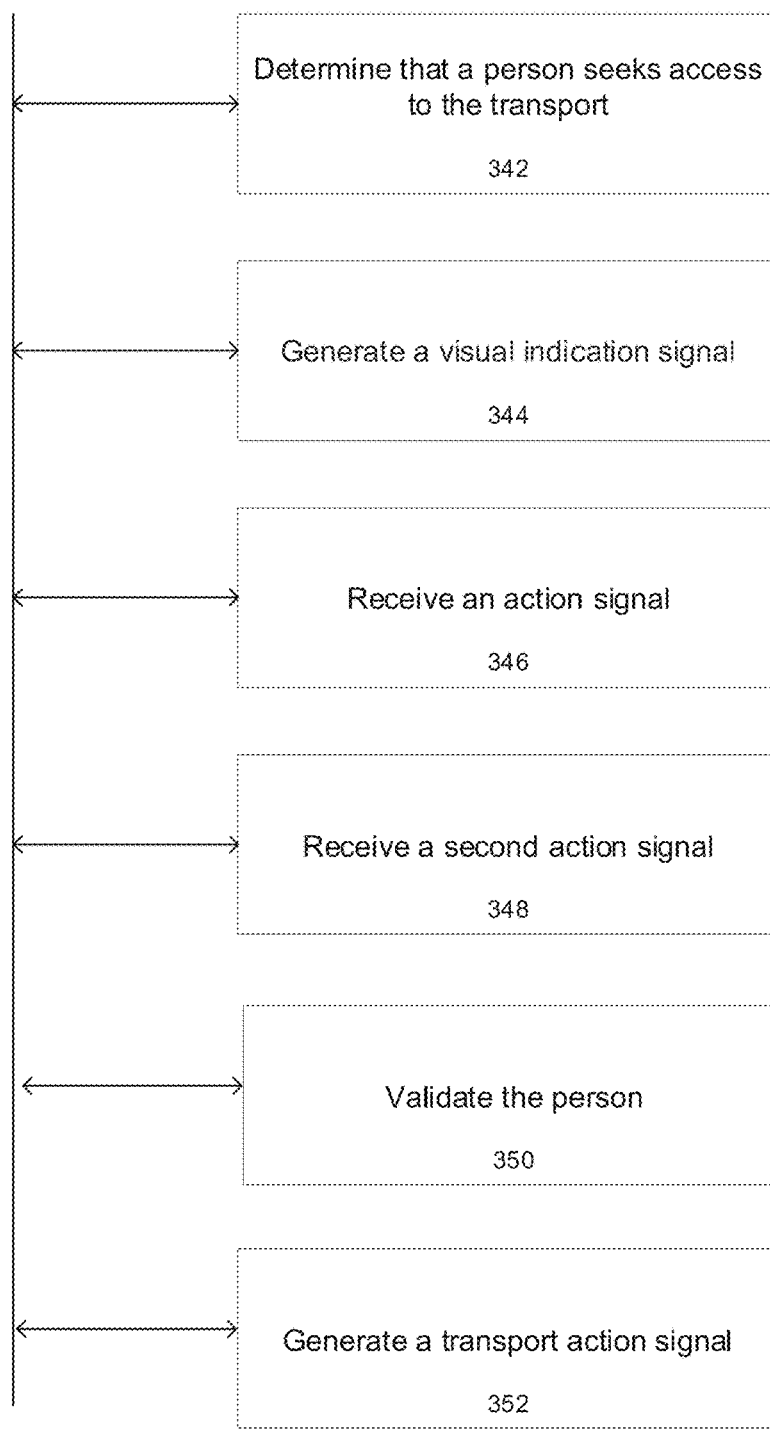
FIG. 3C illustrates yet another flow diagram, according to example embodiments.

FIG. 3C illustrates yet another flow diagram 340, according to example embodiments. Referring to FIG. 3C, an example method may be executed by the processor 108 (see FIG. 1A). It should be understood that the method 340 depicted in FIG. 3C may include additional operations and that some of the operations described therein may be removed and/or modified without departing from the scope of the method 340.

With reference to FIG. 3C, at block 342, the processor 108 may determine that the person 102 seeks access to the transport as shown in FIG. 1A. This determination may be performed in a manner similar to block 302 as discussed above with reference to FIG. 3A. At block 344, the processor 108 may generate a visual indication signal. This determination may be performed in a manner similar to block 304 as discussed above with reference to FIG. 3A. At block 346, the processor 108 may receive an action signal 306. This determination may be performed in a manner similar to block 306 as discussed above with reference to FIG. 3A. At block 348, the processor 108 may generate a second action signal. This generation may be performed in a manner similar to block 306 as discussed above with reference to FIG. 3A, but with a second subsequent action. At block 350, the processor 108 may validate the identity of the person 102. This determination may be performed in a manner similar to block 308 as discussed above with reference to FIG. 3A, wherein the determination is based on both action signals. At block 352, the processor 108 may generate a transport action signal. As discusses above, this generation may include generating a transport action signal to instruct the transport 104 to unlock the doors, to open the trunk, to flash the lights, to honk the horn, to start and combinations thereof.

Figure 3D:
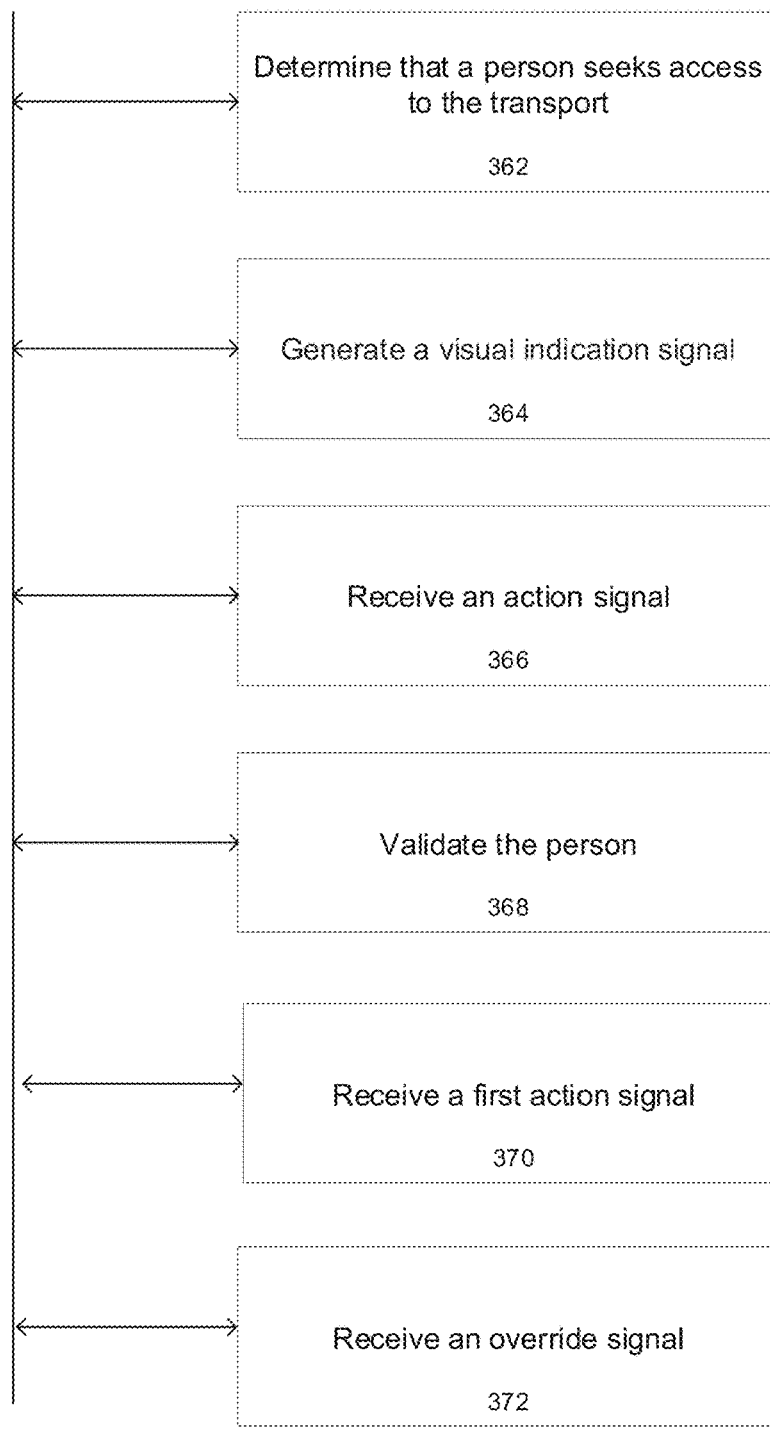
FIG. 3D illustrates still yet another flow diagram, according to example embodiments.

FIG. 3D illustrates yet another flow diagram 360, according to example embodiments. Referring to FIG. 3D, an example method may be executed by the processor 108 (see FIG. 1A). It should be understood that the method 360 depicted in FIG. 3D may include additional operations and that some of the operations described therein may be removed and/or modified without departing from the scope of the method 360.

With reference to FIG. 3D, at block 362, the processor 108 may determine that the person 102 seeks access to the transport as shown in FIG. 1A. This determination may be performed in a manner similar to block 302 as discussed above with reference to FIG. 3A. At block 364, the processor 108 may generate a visual indication signal. This determination may be performed in a manner similar to block 304 as discussed above with reference to FIG. 3A. At block 366, the processor 108 may receive an action signal 306. This determination may be performed in a manner similar to block 306 as discussed above with reference to FIG. 3A. At block 368, the processor 108 may validate the identity of the person 102. This determination may be performed in a manner similar to block 308 as discussed above with reference to FIG. 3A. At block 370, the processor 108 may receive a first action signal. As discussed above, the detecting system 110 may detect the actions performed by the person 102. Once detected, the detecting system 110 provides action detection signals to the processor 108, wherein the action detection signals correspond to the detected parameters of the performed action. However, as discussed previously, there may be situations where detecting system 110 is unable to detect the action, e.g., the person 102 says "hello," but the detecting system 110 is unable to detect the announcement. Therefore, the transport 104 would not grant access to the person 102. In such situations, the person 102 is able to override the transport 104 from not granting access. At block 372, the processor 108 may receive an override signal. Such an override action may be predetermined and stored in a memory of processor 108. The override action may be detected by detecting system 110 in a manner as discussed above with respect to detection of other actions.

Figure 3E:
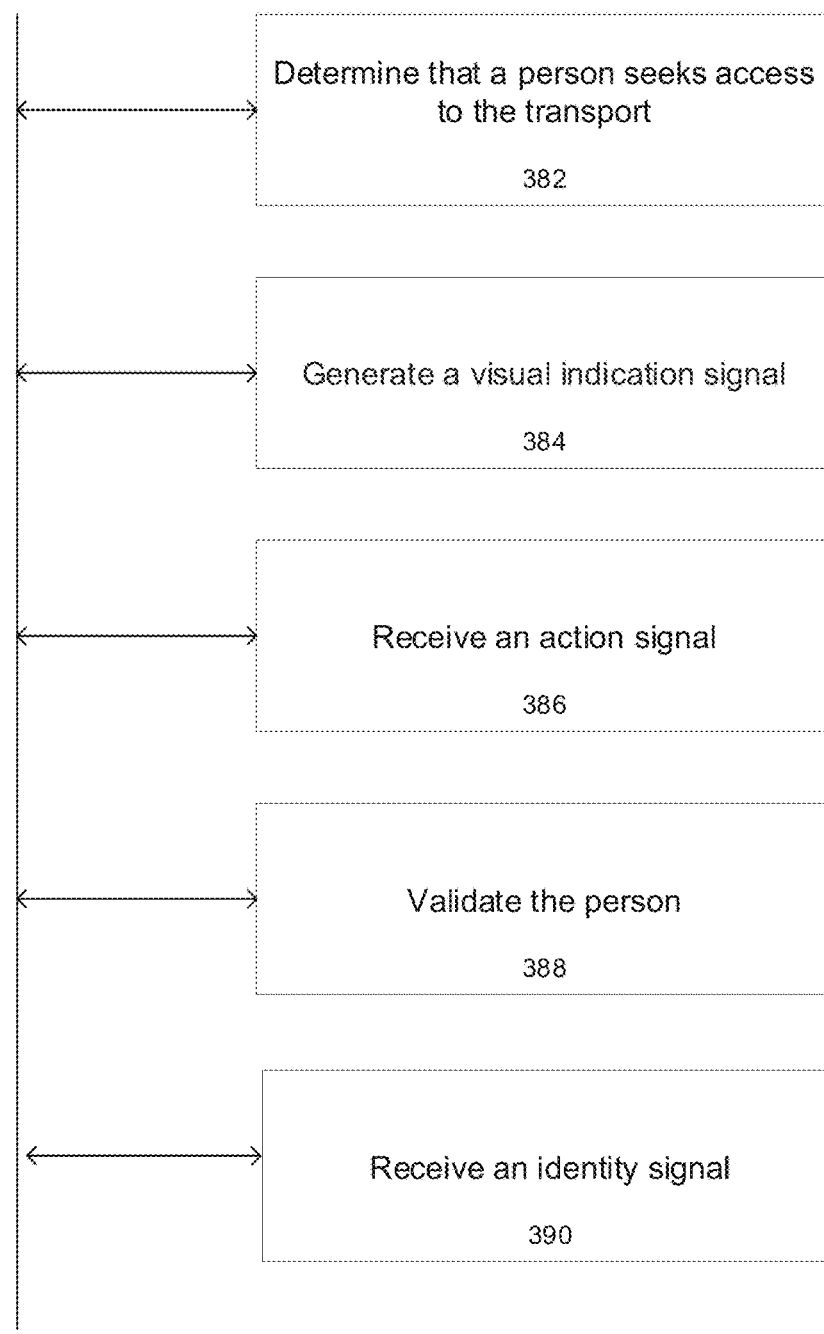
FIG. 3E illustrates a further flow diagram, according to example embodiments.

FIG. 3E illustrates yet another flow diagram 380, according to example embodiments. Referring to FIG. 3E, an example method may be executed by the processor 108 (see FIG. 1A). It should be understood that the method 360 depicted in FIG. 3E may include additional operations and that some of the operations described therein may be removed and/or modified without departing from the scope of the method 360.

With reference to FIG. 3E, at block 382, the processor 108 may determine that the person 102 seeks access to the transport as shown in FIG. 1A. This determination may be performed in a manner similar to block 302 as discussed above with reference to FIG. 3A. At block 384, the processor 108 may generate a visual indication signal. This determination may be performed in a manner similar to block 304 as discussed above with reference to FIG. 3A. At block 386, the processor 108 may receive an action signal 306. This determination may be performed in a manner similar to block 306 as discussed above with reference to FIG. 3A. At block 388, the processor 108 may validate the identity of the person 102. This determination may be performed in a manner similar to block 308 as discussed above with reference to FIG. 3A. At block 390, the processor 108 may receive an identity signal. As shown in FIG. 1E, an identity signal, e.g., the identity signal 182, may be provided directly to the transport 164 by way of a peer-to-peer wireless communication network. Alternatively, the transport 164 may receive an identity signal, e.g., the identity signal 182, by way of a wireless communication network 174, which may include a Wi-Fi, Bluetooth, cellular communication network or combination thereof. As shown in FIG. 1A, communication system 114 may initially receive an identity signal and then provide the identity signal to the processor 108.

Figure 4:
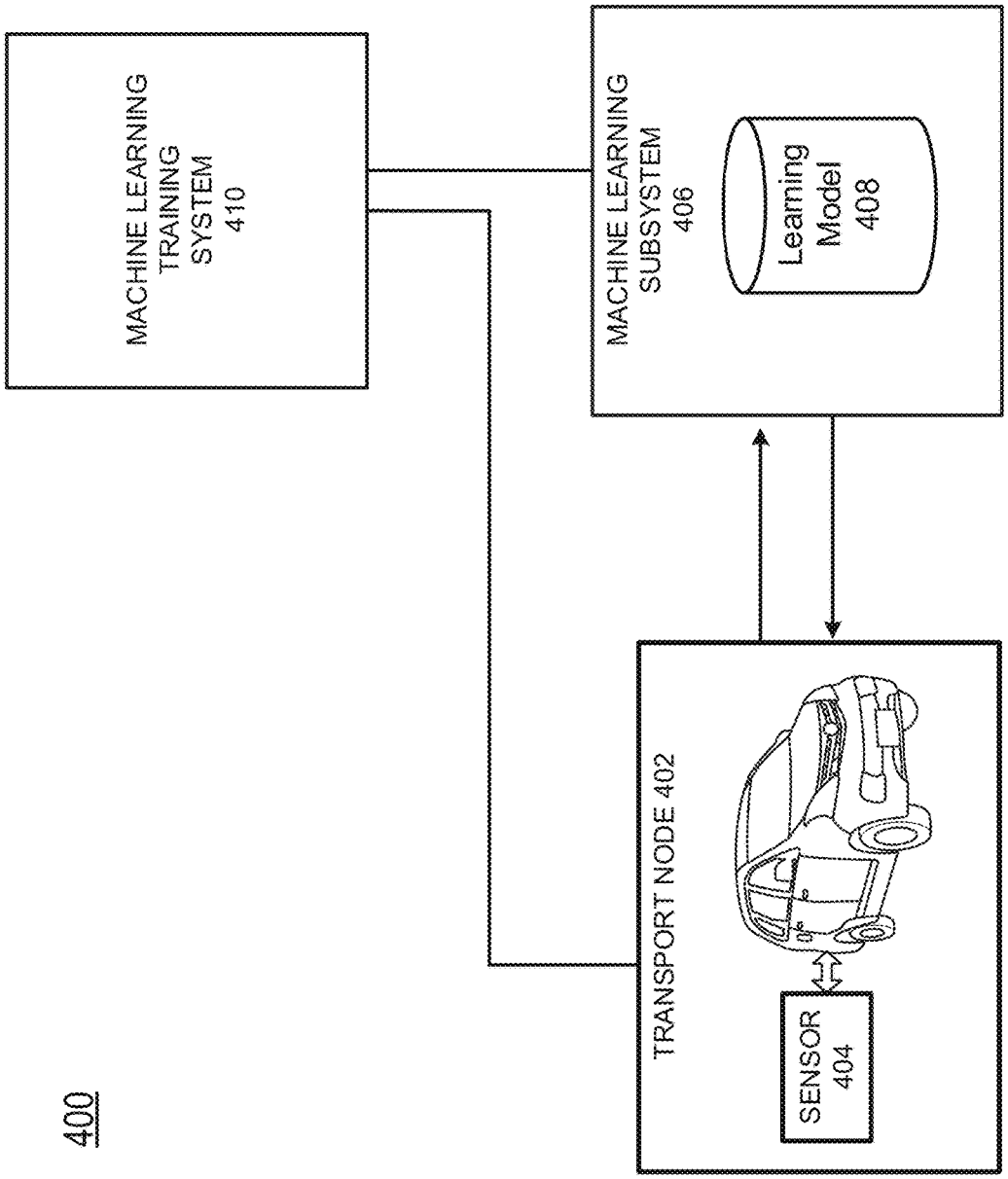
FIG. 4 illustrates a machine learning transport network diagram, according to example embodiments.

FIG. 4 illustrates a machine learning transport network diagram 400, according to example embodiments. The network 400 includes a transport node 402 that interfaces with a machine learning subsystem 406. The transport node includes one or more sensors 404.

The machine learning subsystem 406 contains a learning model 408, which is a mathematical artifact created by a machine learning training system 410 that generates predictions by finding patterns in one or more training data sets. In some embodiments, the machine learning subsystem 406 resides in the transport node 402. In other embodiments, the machine learning subsystem 406 resides outside of the transport node 402.

The transport node 402 sends data from the one or more sensors 404 to the machine learning subsystem 406. The machine learning subsystem 406 provides the one or more sensor 404 data to the learning model 408, which returns one or more predictions. The machine learning subsystem 406 sends one or more instructions to the transport node 402 based on the predictions from the learning model 408.

In a further embodiment, the transport node 402 may send the one or more sensor 404 data to the machine learning training system 410. In yet another embodiment, the machine learning subsystem 406 may sent the sensor 404 data to the machine learning subsystem 410. One or more of the applications, features, steps, solutions, etc., described and/or depicted herein may utilize the machine learning network 400 as described herein.

Figure 5A:
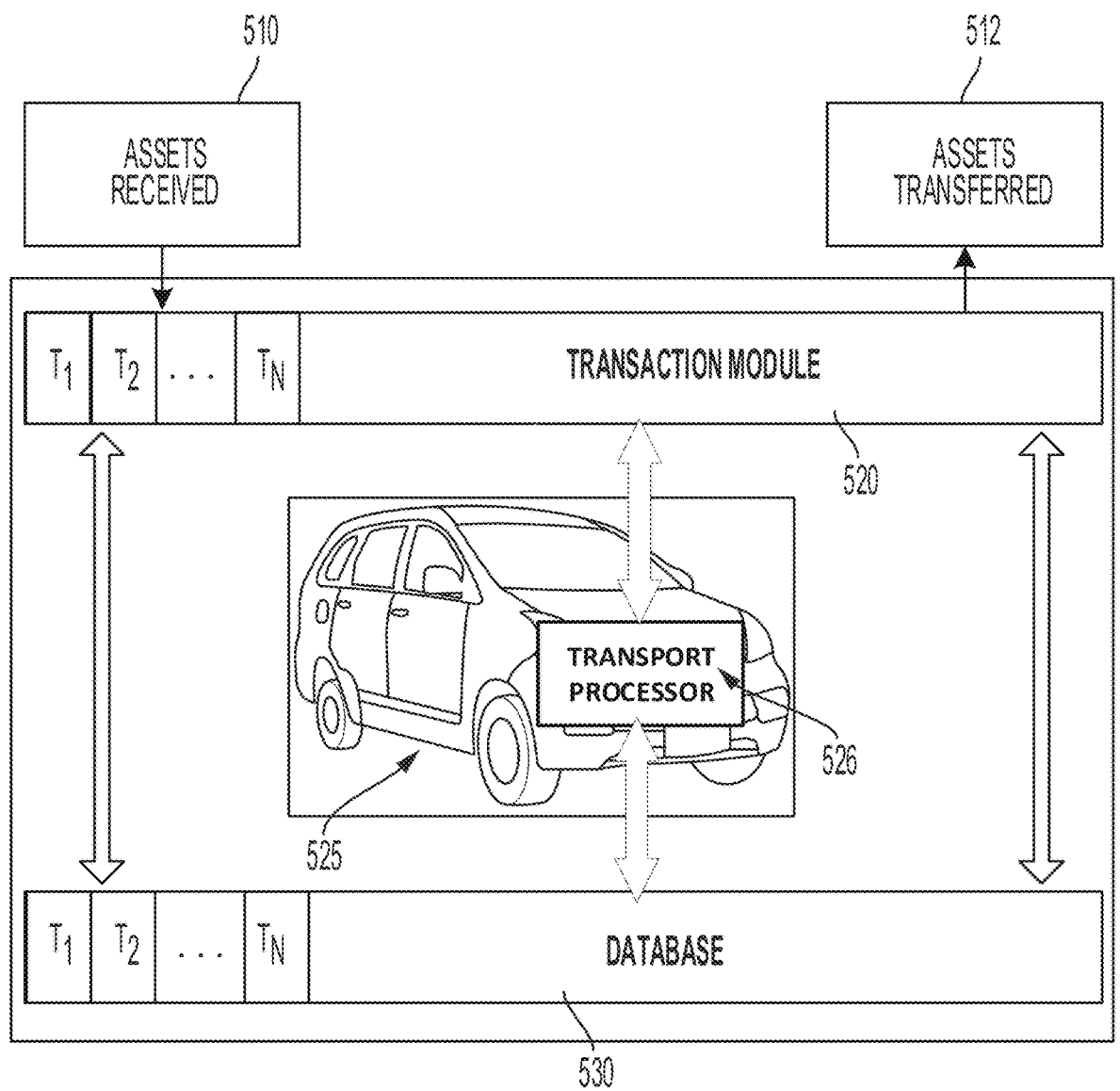
FIG. 5A illustrates an example vehicle configuration for managing database transactions associated with a vehicle, according to example embodiments.

FIG. 5A illustrates an example vehicle configuration 500 for managing database transactions associated with a vehicle, according to example embodiments. Referring to FIG. 5A, as a particular transport/vehicle 525 is engaged in transactions (e.g., vehicle service, dealer transactions, delivery/pickup, transportation services, etc.), the vehicle may receive assets 510 and/or expel/transfer assets 512 according to a transaction(s). A transport processor 526 resides in the vehicle 525 and communication exists between the transport processor 526, a database 530, a transport processor 526 and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, an RDBMS, a relational database, a non-relational database, a blockchain, a distributed ledger, and may be on board the transport, may be off board the transport, may be accessible directly and/or through a network, or be accessible to the transport.

Figure 5B:
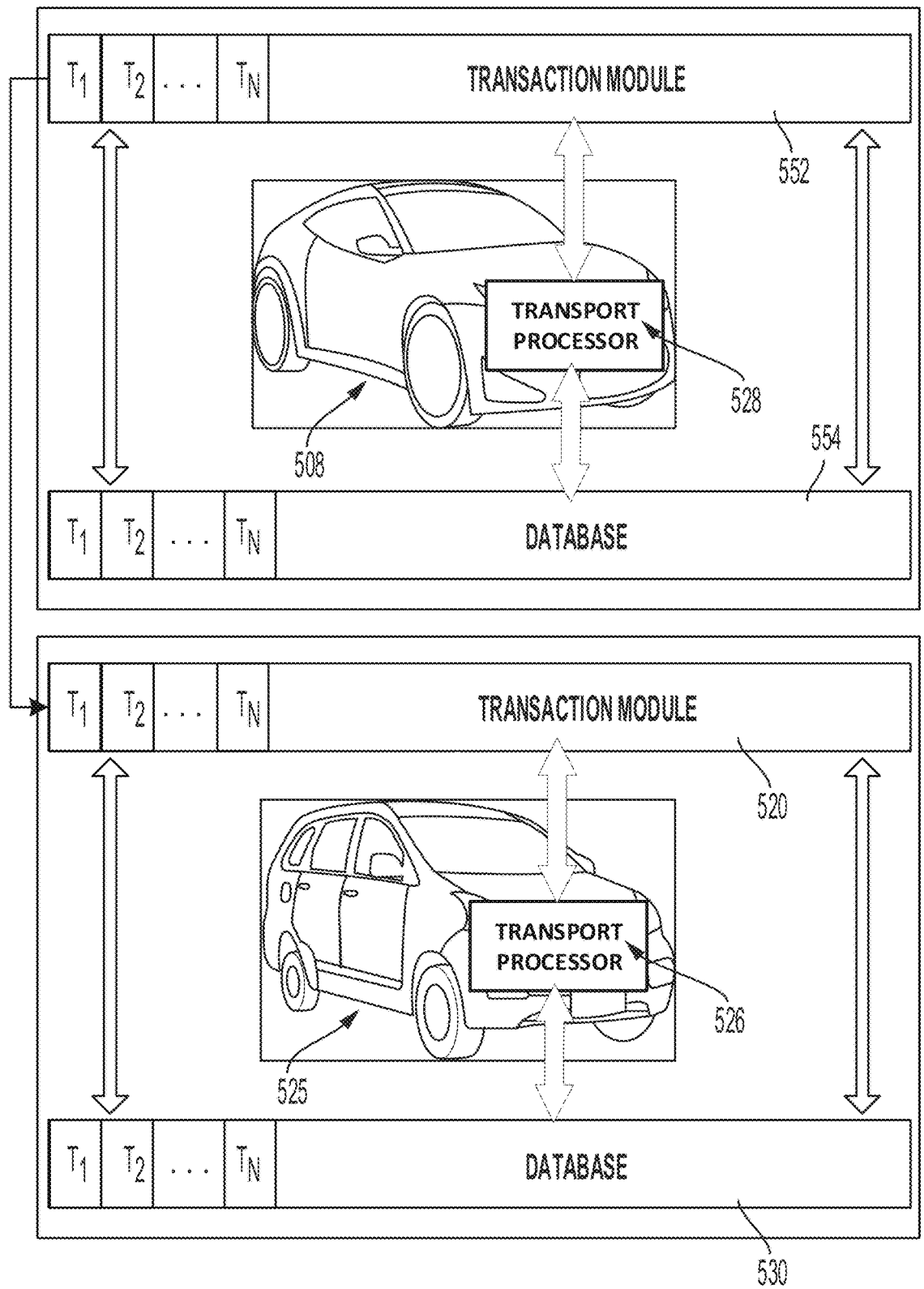
FIG. 5B illustrates another example vehicle configuration for managing database transactions conducted among various vehicles, according to example embodiments

FIG. 5B illustrates an example vehicle configuration 550 for managing database transactions conducted among various vehicles, according to example embodiments. The vehicle 525 may engage with another vehicle 508 to perform various actions such as to share, transfer, acquire service calls, etc., when the vehicle has reached a status where the services need to be shared with another vehicle. For example, the vehicle 508 may be due for a battery charge and/or may have an issue with a tire and may be in route to pick up a package for delivery. A transport processor 528 resides in the vehicle 508 and communication exists between the transport processor 528, a database 554, a transport processor 528 and the transaction module 552. The vehicle 508 may notify another vehicle 525, which is in its network and which operates on its blockchain member service. A transport processor 526 resides in the vehicle 525 and communication exists between the transport processor 526, a database 530, the transport processor 526 and a transaction module 520. The vehicle 525 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 525 and the record of the transferred service is logged in the database 530/554 assuming that the blockchains are different from one another, or, are logged in the same blockchain used by all members. The database 554 can be one of a SQL database, an RDBMS, a relational database, a non-relational database, a blockchain, a distributed ledger, and may be on board the transport, may be off board the transport, may be accessible directly and/or through a network.

Figure 6A:
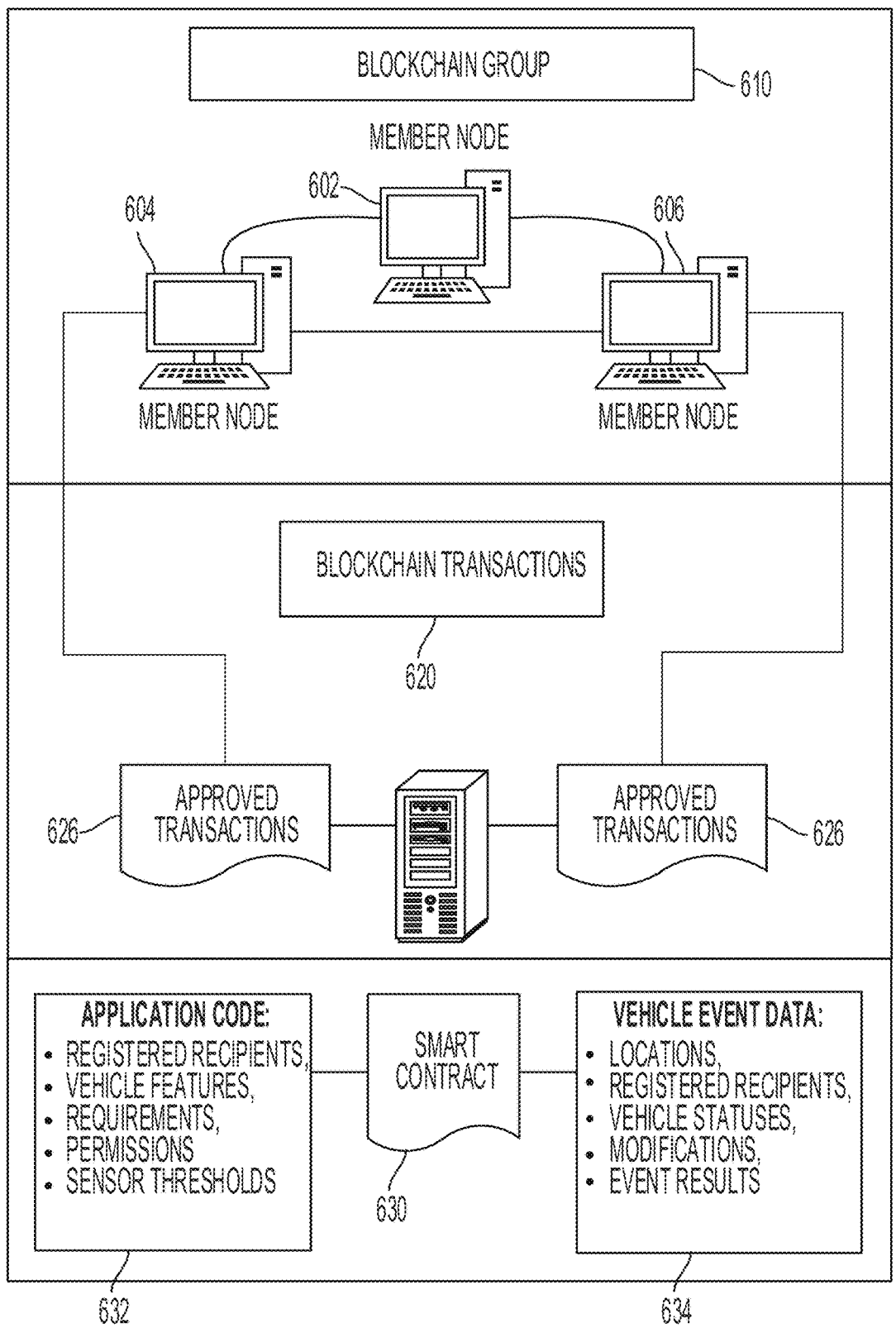
FIG. 6A illustrates a blockchain architecture configuration, according to example embodiments.

FIG. 6A illustrates a blockchain architecture configuration 600, according to example embodiments. Referring to FIG. 6A, the blockchain architecture 600 may include certain blockchain elements, for example, a group of blockchain member nodes 602-606 as part of a blockchain group 610. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 620 are stored in memory of computers as the transactions are received and approved by the consensus model dictated by the members' nodes. Approved transactions 626 are stored in current blocks of the blockchain and committed to the blockchain via a committal procedure, which includes performing a hash of the data contents of the transactions in a current block and referencing a previous hash of a previous block. Within the blockchain, one or more smart contracts 630 may exist that define the terms of transaction agreements and actions included in smart contract executable application code 632, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 634, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 630, which are then stored in a blockchain. For example, sensor thresholds stored in the smart contract can be used as the basis for whether a detected service is necessary and when and where the service should be performed.

Figure 6B:
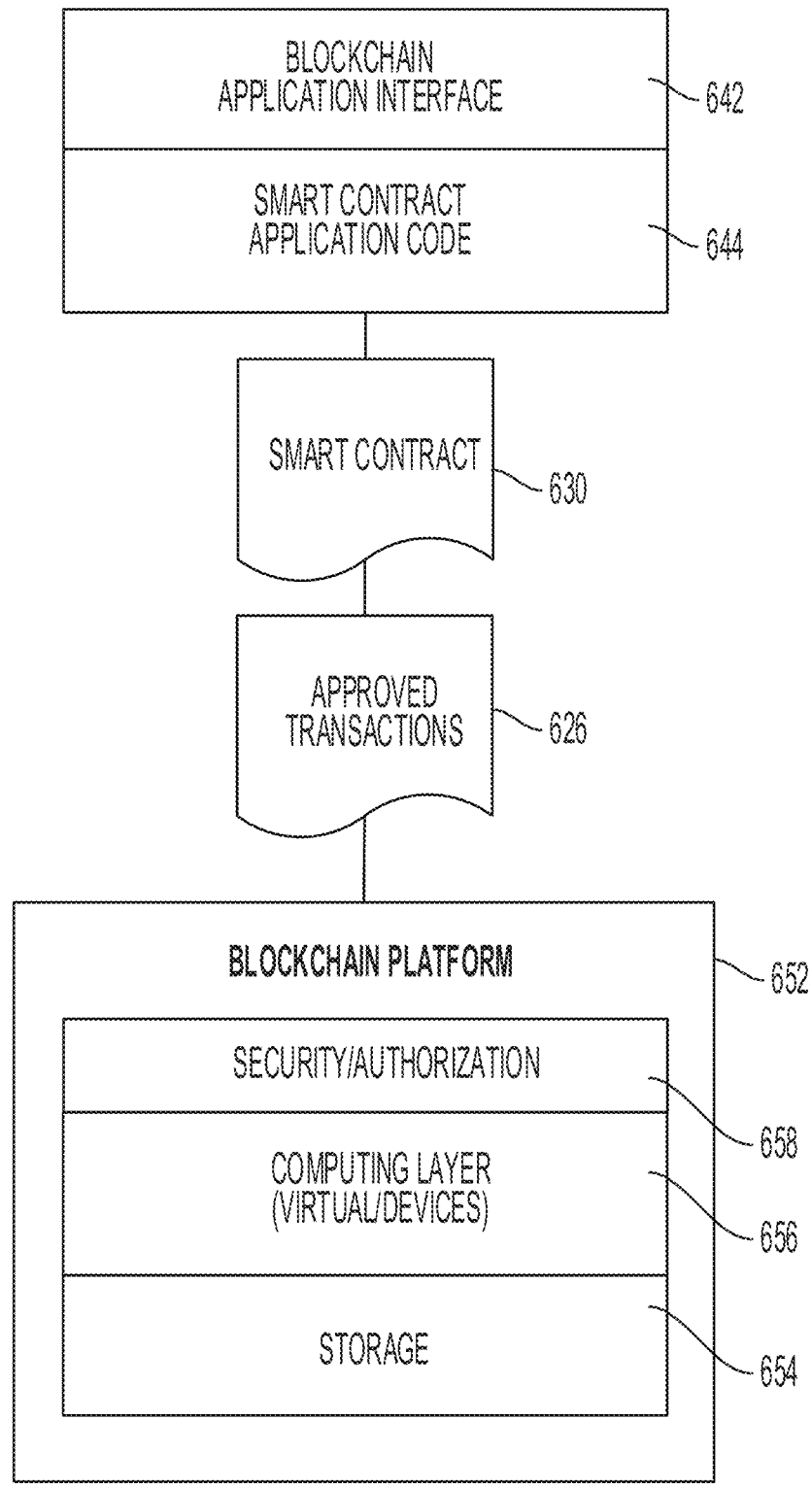
FIG. 6B illustrates another blockchain configuration, according to example embodiments.

FIG. 6B illustrates a shared ledger configuration, according to example embodiments. Referring to FIG. 6B, the blockchain logic example 640 includes a blockchain application interface 642 as an API or plug-in application that links to the computing device and execution platform for a particular transaction. The blockchain configuration 640 may include one or more applications, which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 644 provides a basis for the blockchain transactions by establishing application code, which when executed causes the transaction terms and conditions to become active. The smart contract 630, when executed, causes certain approved transactions 626 to be generated, which are then forwarded to the blockchain platform 652. The platform includes a security/authorization 658, computing devices, which execute the transaction management 656 and a storage portion 654 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors, which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 6A and 6B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code, which is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 6C:
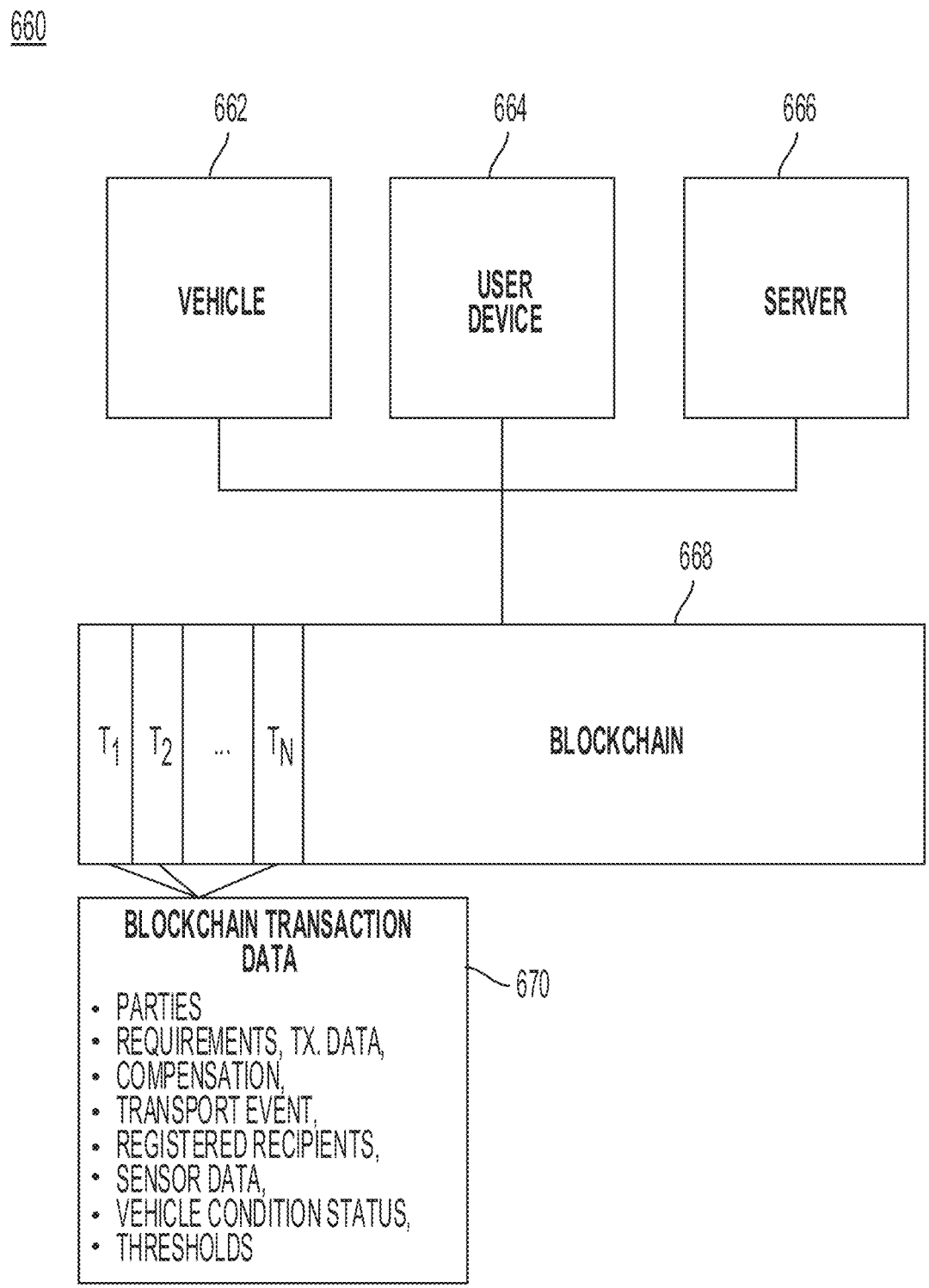
FIG. 6C illustrates a blockchain configuration for storing blockchain transaction data, according to example embodiments.

FIG. 6C illustrates a blockchain configuration for storing blockchain transaction data, according to example embodiments. Referring to FIG. 6C, the example configuration 660 provides for the vehicle 662, the user device 664 and a server 666 sharing information with a distributed ledger (i.e., blockchain) 668. The server may represent a service provider entity inquiring with a vehicle service provider to share user profile rating information in the event that a known and established user profile is attempting to rent a vehicle with an established rated profile. The server 666 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 670 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 6D:
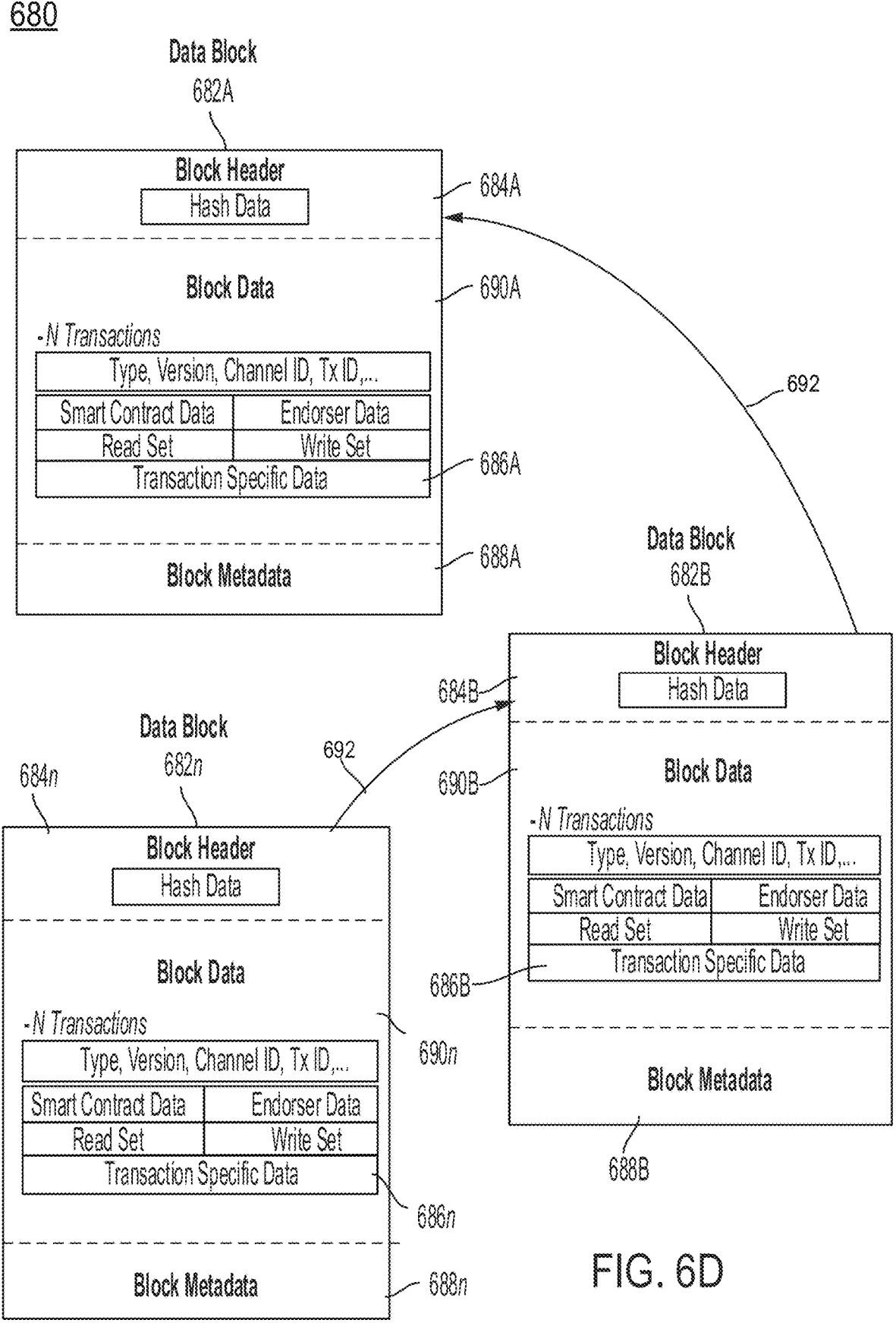
FIG. 6D illustrates example data blocks, according to example embodiments.

FIG. 6D illustrates blockchain blocks 680 that can be added to a distributed ledger, according to example embodiments, and contents of block structures 682A to 682*n*. Referring to FIG. 6D, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers, which verify endorsements, validate entries, and commit entries to the distributed ledger. In this example, the blockchain nodes may perform the role of endorser node, committer node, or both.

The instant system includes a blockchain, which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts, which simulate the entry proposals. When an endorsing node endorses an entry, the endorsing nodes creates an entry endorsement, which is a signed response from the endorsing node to the client application indicating the endorsement of the simulated entry. The method of endorsing an entry depends on an endorsement policy, which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 682A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6D, a block 682A (also referred to as a data block) that is stored on the blockchain and/or the distributed ledger may include multiple data segments such as a block header 684A to 684*n*, transaction specific data 686A to 686*n*, and block metadata 688A to 688*n*. It should be appreciated that the various depicted blocks and their contents, such as block 682A and its contents are merely for purposes of an example and are not meant to limit the scope of the example embodiments. In some cases, both the block header 684A and the block metadata 688A may be smaller than the transaction specific data 686A, which stores entry data; however, this is not a requirement. The block 682A may store transactional information of N entries (e.g., 100, 500, 1000, 2000, 3000, etc.) within the block data 690A to 690*n*. The block 682A may also include a link to a previous block (e.g., on the blockchain) within the block header 684A. In particular, the block header 684A may include a hash of a previous block's header. The block header 684A may also include a unique block number, a hash of the block data 690A of the current block 682A, and the like. The block number of the block 682A may be unique and assigned in an incremental/sequential order starting from zero. The first block in the blockchain may be referred to as a genesis block, which includes information about the blockchain, its members, the data stored therein, etc.

The block data 690A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 690A may also store transaction specific data 686A, which adds additional information to the hash-linked chain of blocks in the blockchain. Accordingly, the data 686A can be stored in an immutable log of blocks on the distributed ledger. Some of the benefits of storing such data 686A are reflected in the various embodiments disclosed and depicted herein. The block metadata 688A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 690A and a validation code identifying whether an entry was valid/invalid.

The other blocks 682B to 682*n* in the blockchain also have headers, files, and values. However, unlike the first block 682A, each of the headers 684A to 684*n* in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 692, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

In another embodiment, the determining that an individual seeks access to a transport may further comprise obtaining, by a camera associated with the transport, consecutive sequential images of the individual, identifying, by a computer coupled to the camera, the individual in each of the consecutive sequential images, calculating, by the computer, that a height of the individual continuously increases in sequential images, and observing that the individual is facing the transport. Further, the visual indication may comprise determining, by the transport, the at least one action, transmitting, by the transport, a request to perform the at least one action to a device associated with the individual, and displaying, by the device, the request to perform the at least one action. In yet another embodiment, the response to validating that the individual is associated with a transport further comprises unlocking a driver's door of the transport, starting an engine or motor of the transport, initiating air conditioning of the transport in response to an outside temperature is above a first predetermined temperature, and initiating interior heating of the transport in response to an outside temperature is below a second predetermined temperature lower than the first predetermined temperature. In yet a further embodiment, the response to validating the individual is associated with a transport comprises determining, by the transport, an identity of the individual, and modifying the one or more actions based on the identity. In another embodiment, the response to determining that the individual seeks access to the transport and prior to visually indicating the at least one action comprises transmitting, by the transport, a menu of actions to a device associated with the individual, selecting, by the individual, at least one action from the menu, and transmitting, by the device, the at least one action to the transport.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
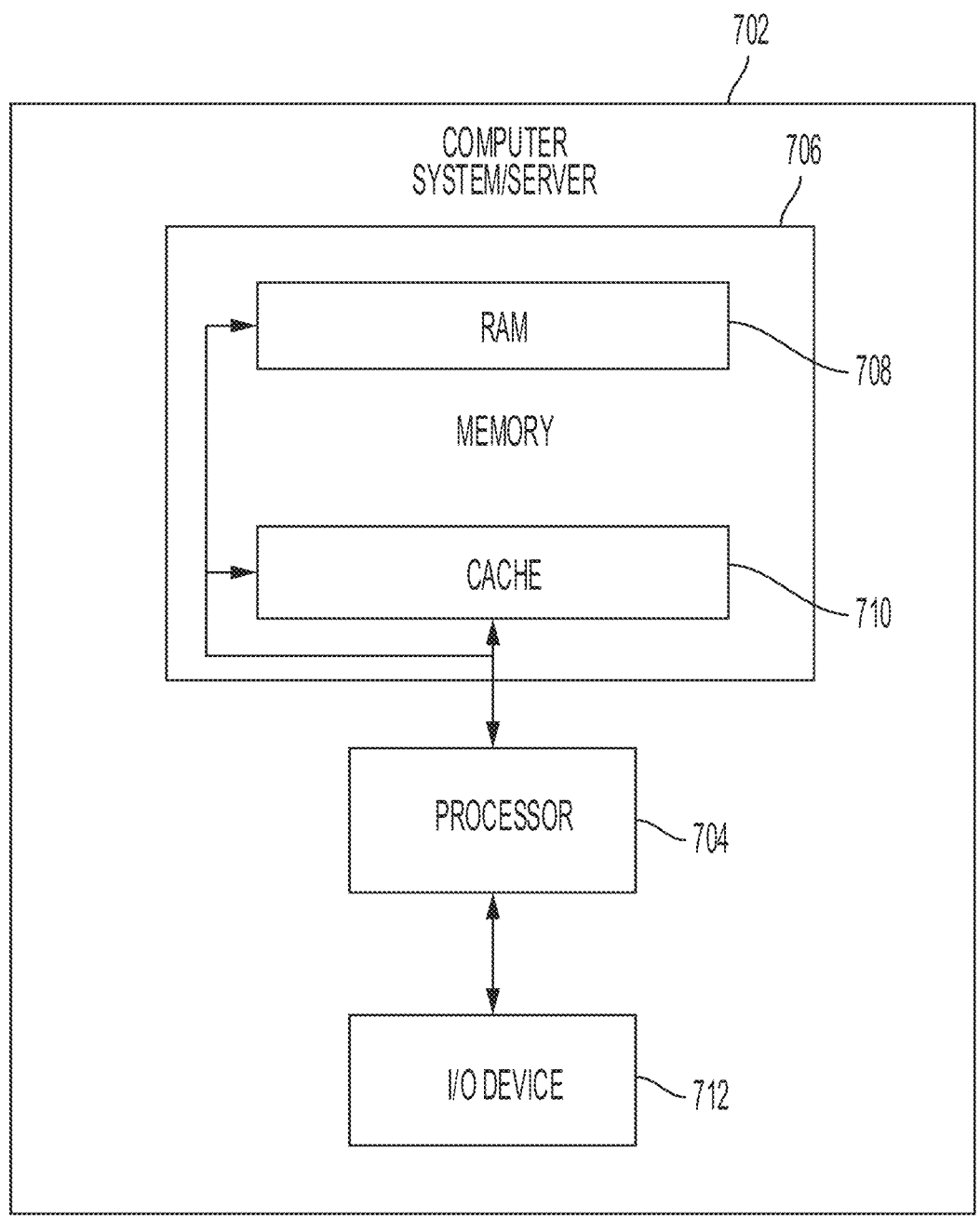
FIG. 7 illustrates an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 708 and/or cache memory 710. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O device 712 (such as an I/O adapter), which may include a keyboard, a pointing device, a display, a voice recognition module, etc., one or more devices that enable a user to interact with computer system/server 702, and/or any devices (e.g., network card, modem, etc.) that enable computer system/server 702 to communicate with one or more other computing devices. Such communication can occur via I/O interfaces of the device 712. Still yet, computer system/server 702 can communicate with one or more networks such as a local area network (LAN), a general wide area network (WAN), and/or a public network (e.g., the Internet) via a network adapter. As depicted, device 712 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   determining, via a transport, that a person is approaching the transport;
   providing, via the transport, an image displayed on an external surface of the transport, wherein the image comprises an object unrelated to an action for the person to perform, and the image is based on a public key and a corresponding private key stored in memory;
   receiving, via the transport, the action corresponding to the private key; and
   validating, via the transport, that the person is associated with the transport wherein the action matches the private key.

2. The method of claim 1, further comprising performing, via the transport, a transport action based on the validating.

3. The method of claim 1, further comprising:
   receiving, via the transport, a second action; and
   performing, via the transport, a transport action based on the second action.

4. The method of claim 1, further comprising
   displaying, on an exterior portion of the transport, instructions for the person to perform the action.

5. The method of claim 1, wherein the receiving comprises detecting a motion and a position of the person via an imaging system.

6. The method of claim 1, wherein the receiving comprises detecting a change in an actuator of a transport.

7. The method of claim 1, further comprising:
   determining, via a second transport, an approaching and a location of the person; and
   providing, via the second transport, the approaching and the location of the person to the transport.

8. A server, comprising:
   a processor; and
   a memory;
   wherein the processor is configured to:
      determine that a person is approaching a transport;
      provide an image displayed on an external surface of the transport wherein the image comprises an object unrelated to an action for the person to perform, and the image is based on a public key and a corresponding private key stored in memory;
      receive the action corresponding to the private key; and
      validate that the person is associated with the transport wherein the action matches the private key.

9. The server of claim 8,
   wherein the processor is further configured to generate a transport action signal based on the validation, wherein the transport action signal is operable to instruct the transport to perform a transport action.

10. The server of claim 8, wherein the processor is further configured to:
    receive a second action signal, from a second detector, associated with detection of performance of a second action; and
    generate a transport action signal based on the second action signal,
    wherein the transport action signal is operable to instruct the transport to perform a transport action.

11. The server of claim 8,
    wherein the image comprises instructions for the person to perform the action.

12. The server of claim 8, the processor is further configured to receive the action signal via one or more sensors operable to detect a motion of the person, a sound of the person, and a change in an actuator of the transport.

13. The server of claim 8, wherein the processor is further configured to:
    receive a first action signal, from a first detector, associated with detection of performance of a first action;
    receive an override signal, from a second detector, associated with detection of performance of an override action when the person is not validated as being associated with the transport, based on the first action signal; and
    generate a visual indication signal based on the override signal.

14. The server of claim 8, wherein the processor is further configured to receive, from a second transport, an identity signal that identifies and locates the person.

15. A non-transitory computer readable medium comprising instructions, that when read by a processor, cause the processor to:
    determine that a person is approaching a transport;
    provide an image displayed on an external surface of the transport, wherein the image comprises an object unrelated to an action for the person to perform, and wherein the image is based on a public key and a corresponding private key stored in memory;
    receive an action signal corresponding to the private key; and
    validate that the person is associated with the transport wherein the action matches the private key.

16. The non-transitory computer readable medium of claim 15, wherein the non-transitory computer readable medium further comprises instructions, that when read by a processor, cause the processor to further:
    generate a transport action signal based on the validating, wherein the transport action signal is operable to instruct the transport to perform a transport action.

17. The non-transitory computer readable medium of claim 15, wherein the non-transitory computer readable medium further comprises instructions, that when read by a processor, cause the processor to further:
    receive a second action signal, from a second detector, associated with detection of performance of a second action; and
    generate a transport action signal based on the second action signal,
    wherein the transport action signal is operable to instruct the transport to perform a transport action.

18. The non-transitory computer readable medium of claim 15,
    wherein the image comprises instructions for the person to perform the action.

19. The non-transitory computer readable medium of claim 15, wherein the non-transitory computer readable medium further comprises instructions, that when read by a processor, cause the processor to further:
- receive a first action signal, from a first detector, associated with detection of performance of a first action; and
- receive an override signal, from a second detector, associated with detection of performance of an override action when the person is not validated as being associated with the transport, based on the first action signal,
- generate a visual indication signal based on the override signal.

20. The non-transitory computer readable medium of claim 15, wherein the processor is further configured to receive, from a second transport, an identity signal identifying and locating the person.

* * * * *